(12) United States Patent
Acosta et al.

(10) Patent No.: US 7,913,020 B2
(45) Date of Patent: Mar. 22, 2011

(54) AUTOMATED EXCHANGEABLE DOCKING CONFIGURATION

(75) Inventors: Keith H. Acosta, Stow, MA (US); Ryan P. Chaves, Cambridge, MA (US); Ronald N. Isaac, Shrewsbury, MA (US); Paulo S. Mendes, Hopkinton, MA (US); Morton Tarr, Bolton, MA (US); Christopher D. Vincent, Needham, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 12/111,252

(22) Filed: Apr. 29, 2008

(65) Prior Publication Data

US 2009/0271534 A1    Oct. 29, 2009

(51) Int. Cl.
*G06F 13/00* (2006.01)
*G06F 1/24* (2006.01)
*G06F 9/00* (2006.01)

(52) U.S. Cl. .................. 710/303; 710/304; 713/100

(58) Field of Classification Search .......... 710/301–306, 710/100; 361/679, 679.41; 713/100
See application file for complete search history.

(56) References Cited

U.S. PATENT DOCUMENTS

| | | | |
|---|---|---|---|
| 5,280,229 A | | 1/1994 | Faude et al. |
| 5,610,992 A | | 3/1997 | Hickman |
| 5,689,574 A | | 11/1997 | Heirich et al. |
| 5,732,145 A | | 3/1998 | Tsao et al. |
| 5,802,194 A | | 9/1998 | Yamagishi et al. |
| 5,841,790 A | * | 11/1998 | Salem et al. .................. 714/724 |
| 5,881,989 A | | 3/1999 | O'Brien et al. |
| 6,007,228 A | * | 12/1999 | Agarwal et al. ................. 700/94 |
| 6,067,362 A | | 5/2000 | Lemanski et al. |
| 6,173,064 B1 | | 1/2001 | Anagnos |
| 6,255,800 B1 | | 7/2001 | Bork |
| 6,275,595 B1 | | 8/2001 | Lundgren et al. |
| 6,359,994 B1 | | 3/2002 | Markow et al. |
| 6,407,554 B1 | * | 6/2002 | Godau et al. .................. 324/503 |
| 6,415,036 B1 | | 7/2002 | Ritter et al. |
| 6,477,042 B1 | | 11/2002 | Allgeyer et al. |
| 6,525,775 B1 | | 2/2003 | Kahn et al. |

(Continued)

FOREIGN PATENT DOCUMENTS

EP    1185094 A2    3/2002

(Continued)

OTHER PUBLICATIONS

"Gadgets," Engineering & Technology, IEEE, Oct. 2006, vol. 1, No. 7, pp. 42-43.*

(Continued)

*Primary Examiner* — Faisal M Zaman

(57) ABSTRACT

A base device meant to cooperate with one of a plurality of exchangeable docking adapters to enable the base device to cooperate with a personal portable device docked with the docking adapter to perform an audio/visual task. The base device incorporates a programmable logic that is programmed with a configuration data specifying a configuration of interconnections to enable the cooperation between the base device and the personal portable device, and may further incorporate a processor to execute a sequence of instructions of a routine causing the processor to cooperate with the personal portable device through the docking adapter to perform the task. The configuration data and/or the routine may be selected depending on which docking adapter is coupled to the base device, depending on a comparison of versions of configuration data and/or routine stored within one or both of the base device and the docking adapter, and/or depending on the identity of one or more of the base device, the docking adapter, the personal portable device, and the programmable logic.

51 Claims, 9 Drawing Sheets

U.S. PATENT DOCUMENTS

| | | | |
|---|---|---|---|
| 6,597,794 | B2 | 7/2003 | Cole et al. |
| 6,694,200 | B1 | 2/2004 | Naim |
| 6,721,489 | B1* | 4/2004 | Benyamin et al. ............ 386/243 |
| 6,741,717 | B2 | 5/2004 | Dedieu et al. |
| 6,744,903 | B1 | 6/2004 | Jeon et al. |
| 6,788,528 | B2* | 9/2004 | Enners et al. ............ 361/679.41 |
| 6,867,614 | B1* | 3/2005 | Le Graverand et al. ........ 326/38 |
| 7,095,867 | B2* | 8/2006 | Schul et al. .................... 381/334 |
| 7,155,214 | B2 | 12/2006 | Struthers et al. |
| 7,580,254 | B2* | 8/2009 | Anderson ................ 361/679.41 |
| 7,607,005 | B1* | 10/2009 | Lewis ........................... 713/100 |
| 7,651,368 | B2* | 1/2010 | Kendall et al. ................ 439/527 |
| 7,782,012 | B2* | 8/2010 | Jo ................................. 320/115 |
| 7,831,757 | B2* | 11/2010 | Habuto et al. ................. 710/303 |
| 2001/0001319 | A1 | 5/2001 | Beckert et al. |
| 2001/0031059 | A1 | 10/2001 | Borgonovo |
| 2001/0039200 | A1 | 11/2001 | Azima et al. |
| 2002/0073252 | A1 | 6/2002 | Arbiter et al. |
| 2002/0085730 | A1 | 7/2002 | Holland |
| 2002/0115480 | A1 | 8/2002 | Huang |
| 2002/0150261 | A1 | 10/2002 | Moeller et al. |
| 2002/0171567 | A1 | 11/2002 | Altare et al. |
| 2002/0186319 | A1 | 12/2002 | Whitby et al. |
| 2003/0059038 | A1 | 3/2003 | Meyerson et al. |
| 2003/0063767 | A1 | 4/2003 | Dedieu et al. |
| 2003/0135868 | A1 | 7/2003 | DeGeorge |
| 2004/0106454 | A1 | 6/2004 | Walker et al. |
| 2004/0150944 | A1 | 8/2004 | Byrne et al. |
| 2004/0162029 | A1 | 8/2004 | Grady |
| 2004/0203738 | A1 | 10/2004 | Janssen et al. |
| 2004/0204056 | A1 | 10/2004 | Phelps |
| 2004/0234085 | A1 | 11/2004 | Lennox |
| 2005/0013103 | A1* | 1/2005 | Chandley ...................... 361/683 |
| 2005/0018839 | A1 | 1/2005 | Weiser |
| 2005/0185364 | A1* | 8/2005 | Bell et al. ...................... 361/679 |
| 2005/0239434 | A1 | 10/2005 | Marlowe |
| 2005/0244025 | A1 | 11/2005 | Schul et al. |
| 2005/0255895 | A1 | 11/2005 | Lee et al. |
| 2006/0013411 | A1 | 1/2006 | Lin |
| 2006/0046778 | A1 | 3/2006 | Hembree |
| 2006/0046780 | A1 | 3/2006 | Subramaniam et al. |
| 2006/0134959 | A1 | 6/2006 | Ellenbogen |
| 2006/0161713 | A1* | 7/2006 | Belady ........................... 710/303 |
| 2006/0181840 | A1 | 8/2006 | Cvetko |
| 2006/0215994 | A1 | 9/2006 | Sasabe |
| 2006/0250764 | A1 | 11/2006 | Howarth et al. |
| 2006/0253879 | A1 | 11/2006 | Lin |
| 2007/0002533 | A1 | 1/2007 | Kogan et al. |
| 2007/0009108 | A1 | 1/2007 | Furge |
| 2007/0014426 | A1 | 1/2007 | Sung et al. |
| 2007/0015457 | A1 | 1/2007 | Krampf et al. |
| 2007/0015486 | A1 | 1/2007 | Marlowe |
| 2007/0035917 | A1 | 2/2007 | Hotelling et al. |
| 2007/0036384 | A1 | 2/2007 | Struthers et al. |
| 2007/0070246 | A1 | 3/2007 | Ishida et al. |
| 2007/0079042 | A1* | 4/2007 | Crosswy et al. ............. 710/303 |
| 2007/0101039 | A1* | 5/2007 | Rutledge et al. ............. 710/303 |
| 2007/0124778 | A1* | 5/2007 | Bennett et al. .................. 725/81 |
| 2007/0217633 | A1 | 9/2007 | Copeland et al. |
| 2007/0226384 | A1 | 9/2007 | Robbin et al. |
| 2007/0230910 | A1* | 10/2007 | Welch et al. ..................... 386/96 |
| 2007/0239849 | A1 | 10/2007 | Robbin et al. |
| 2007/0247794 | A1 | 10/2007 | Jaffe et al. |
| 2007/0254695 | A1 | 11/2007 | Langberg et al. |
| 2008/0134237 | A1* | 6/2008 | Tu et al. .......................... 725/38 |
| 2008/0304692 | A1* | 12/2008 | Zhang ........................... 381/387 |
| 2009/0199219 | A1* | 8/2009 | Rofougaran et al. ......... 719/330 |

FOREIGN PATENT DOCUMENTS

| | | |
|---|---|---|
| EP | 1527801 A3 | 5/2005 |
| EP | 1635607 | 3/2006 |
| GB | 2397707 A | 7/2004 |
| JP | 09274556 A * | 10/1997 |
| JP | 2006074787 A * | 3/2006 |
| JP | 2007243715 A * | 9/2007 |
| JP | 2007243910 A * | 9/2007 |
| JP | 2008160794 A * | 7/2008 |
| WO | 2005/104655 A2 | 11/2005 |
| WO | WO 2006080659 A1 * | 8/2006 |
| WO | 2006/130115 A1 | 12/2006 |
| WO | WO 2007022297 A2 * | 2/2007 |
| WO | 2007/031703 A1 | 3/2007 |
| WO | 2007/049075 A1 | 5/2007 |

OTHER PUBLICATIONS

Nakajima et al., "Virtual memory management for interactive continuous media applications", Jun. 3-6, 1997, IEEE, IEEE International Conference on Multimedia Computing and Systems, pp. 415-423.*

Keming et al., "An easily reconfigurable simulation environment on FPGA based platform", May 28-30, 2005, IEEE, Proceedings of 2005 IEEE International Workshop on VLSI Design and Video Technology, pp. 71-74.*

Wei et al., "Implementing a Serial ATA Controller Base on FPGA", Dec. 12-14, 2009, IEEE, Second International Symposium on Computational Intelligence and Design, vol. 1, pp. 467-470.* www.altecmm.com, Oct. 2003, inMotion portable audio stereo.

www.pcstats.com, Jun. 21, 2004, NoiseControl Novibes III HDD Isolation.

www.reviews.cnet.com, Jul. 23, 2004, Creative Travel sound.

www.jbl.com, Jul. 23, 2004, Creative Travel Sound.

www.earsc.com, Jun. 28, 2004, Stereo Speaker.

Steve Guttenberg, "Altec Lansing InMotion", Internet Citation (online) Jun. 10, 2004 (downloaded Nov. 11, 2006) URL: http://reviews.cnet.com/4505-7869 7-30790793.html.

EP05107420.1 European Search Report, Nov. 20, 2006.

Notice of Allowance dated Aug. 17, 2009 for EP Appl. No. 05107420.1-1224.

International Search Report for PCT/US2008/063563 dated Aug. 18, 2008.

International Search Report for PCT/US2009/038751, dated Aug. 6, 2009.

International Preliminary Report on Patentability for PCT/US2008/063563 dated Aug. 19, 2009.

EP Extended Search Report dated Feb. 8, 2010 for EP Appl. No. 09172112.6-1224 / 2154909.

Altec Lansing Techologies, Inc: "Altec Lansing inMotion User's Guide" 2003, XP002565336 Retrieved from the Internet:URL:http://www.alteclansing.com/images/user/im3c-manual.pdf[retrieved on Jan. 19, 2010].

Apple imac g3, 2000, Apple (http://manuals.info.apple.com/en_US/iMacG3_2000UserManual.PDF).

* cited by examiner

AUTOMATED EXCHANGEABLE DOCKING CONFIGURATION

FIELD

This description relates to a base device cooperating with one or more interchangeable docking adapters to enable interactions between the base device and one or more personal portable devices to perform an audio/visual task.

BACKGROUND

It has become commonplace for people carry personal portable devices (e.g., cell phones, PDAs, PIMs, MP3 players, PNDs, etc.) that they employ to listen to recorded audio, view recorded video, capture a visual image, engage in audio/visual conversations with others, or to perform still other audio/visual tasks. Such personal portable devices are meant to be easily movable from place to place by being easily carried on the persons of their users in some way (e.g., in a pocket, strapped to an arm or wrist, worn over the head or around the neck, clipped to a belt, etc.). Further, such personal portable devices commonly provide a way in which to be directly used in engaging in audio/visual tasks, often by incorporating microphones, speakers, cameras and/or video displays.

However, the portable nature of personal portable devices often means that compromises must be made in supporting direct use of these devices to engage in audio/visual tasks. For example, speakers and video displays are often of a smaller size that render them less capable of reproducing audio or video imagery of a quality that would be achievable were size for the sake of portability not a concern. A common solution for a user of personal portable device who is to remain in one place for some period of time has been the provision of base devices that each have a docking interface to which a particular personal portable device may be physically connected (i.e., "docked") to enable the base device to support higher quality audio and/or video in audio/visual tasks. These base devices are commonly far larger, and therefore, far less portable than the personal portable devices with which they are capable of docking. This enables the use of such components as speakers and video displays that are permitted to be larger, and thereby capable of reproducing higher quality audio and/or video imagery.

Examples of such base devices are the various incarnations of the SoundDock® series of base devices manufactured and sold by Bose® Corporation of Framingham, Mass., meant to be docked with various incarnations of the iPod® series of personal portable devices manufactured and sold by Apple® Corporation of Cupertino, Calif. Docking one of the incarnations of the iPod® with one of the incarnations of the SoundDock enables a user of that iPod® to listen to a higher quality audible output of recorded audio than is possible by employing the earbud-style earphones that are provided with that iPod®.

However, such base devices commonly have docking interfaces that are compatible with only a very limited number of personal portable devices, and in a number of cases, such base devices have docking interfaces that are compatible with only one personal portable device. It is common for different personal portable devices to have casings of different physical shapes, different power requirements for the recharging of batteries, different digital interfaces employing different protocols for the transfer of data (including audio and/or video data), different analog interfaces employing different signal characteristics, among other differences.

SUMMARY

A base device meant to cooperate with one of a plurality of exchangeable docking adapters to enable the base device to cooperate with a personal portable device docked with the docking adapter to perform an audio/visual task. The base device incorporates a programmable logic that is programmed with a configuration data specifying a configuration of interconnections to enable the cooperation between the base device and the personal portable device, and may further incorporate a processor to execute a sequence of instructions of a routine causing the processor to cooperate with the personal portable device through the docking adapter to perform the task. The configuration data and/or the routine may be selected depending on which docking adapter is coupled to the base device, depending on a comparison of versions of configuration data and/or routine stored within one or both of the base device and the docking adapter, and/or depending on the identity of one or more of the base device, the docking adapter, the personal portable device, and the programmable logic.

In one aspect, an apparatus comprises an adapter interface to couple the apparatus to a docking adapter to enable the apparatus to cooperate with a personal portable device docked with the docking adapter to perform an audio/visual task, where the adapter interface is structured to enable the identity of the docking adapter to be determined; a programmable logic electrically coupled to the adapter interface and structured to be configured with a configuration data specifying interconnections within the programmable logic, wherein the configuration data is selected in response to the identity of the docking adapter; and wherein the apparatus is structured to enable an acoustic driver to audibly output audio provided by the personal portable device to the apparatus as part of the audio/visual task.

Implementations may include, and are not limited to, one or more of the following features. The apparatus may be structured to identify the docking adapter via voltage levels detected on a plurality of contacts of a connector and/or via identifying data stored in a storage of the docking adapter. The apparatus may be structured to compare versions of configuration data stored on one or both of the apparatus and the docking adapter, and to select a configuration data in response to the comparison of version. The apparatus may further comprise the acoustic driver, a visual display to display visual imagery provided by the personal portable device, and/or a storage store data from which configuration data may be selected. The apparatus may further comprise a processor and a storage storing a routine that when executed by the processor causes the processor to perform the audio/visual task, and/or causes the processor to compare versions of the routine and to select a version, possibly in response to the identity of the apparatus and/or the identity of the docking adapter.

In one aspect, a method comprises determining an identity of a docking adapter coupled to a base device that is structured to cooperate with a personal portable device through a programmable logic of the base device and through the docking adapter to perform an audio/visual task entailing audibly outputting audio provided to the base device by the personal portable device, selecting a configuration data in response to the identity of the docking adapter, and configuring the programmable logic to enable the base device to cooperate with the personal portable device to perform the audio/visual task.

Implementations may include, and are not limited to, one or more of the following features. The method may further comprise selecting configuration data and/or a routine in response to a determination of whether or not the configuration data is stored within the base device, selecting configuration data in response to a comparison of versions of configuration data stored within one or both of the base device and the docking adapter, and/or selecting configuration data in response to the identity of one or more of the base device, the docking adapter, the personal portable device and the programmable logic.

In one aspect, an apparatus comprises an adapter interface to couple the apparatus to a base device to enable the base device to cooperate with a personal portable device docked with the apparatus to perform an audio/visual task in which the personal portable device provides the base device with audio to audibly output, wherein the adapter interface is structured to enable an identity of the apparatus to be determined by the base device; and a storage accessible to the base device upon coupling the apparatus to the base device, and storing a data from which a configuration data specifying interconnections within a programmable logic of the base device may be selected by the base device in response to the identity of the docking adapter to enable the base device to cooperate with the personal portable device to perform the audio/visual task.

Implementations may include, and are not limited to, one or more of the following features. The apparatus may be structured to identify itself to the base device via tying each of a plurality of contacts of a connector to one or more voltage levels, and/or via identifying data stored in a storage of the apparatus. The apparatus may store multiple versions of configuration data and/or routines to be accessed by the base device. The apparatus may further comprise a processor to execute a sequence of instructions causing the processor to assist the base device in cooperating with the personal portable device in performing the audio/visual task, and/or a wireless transceiver to enable the base device to cooperate with the personal portable device wirelessly.

DESCRIPTION

Figure 1:
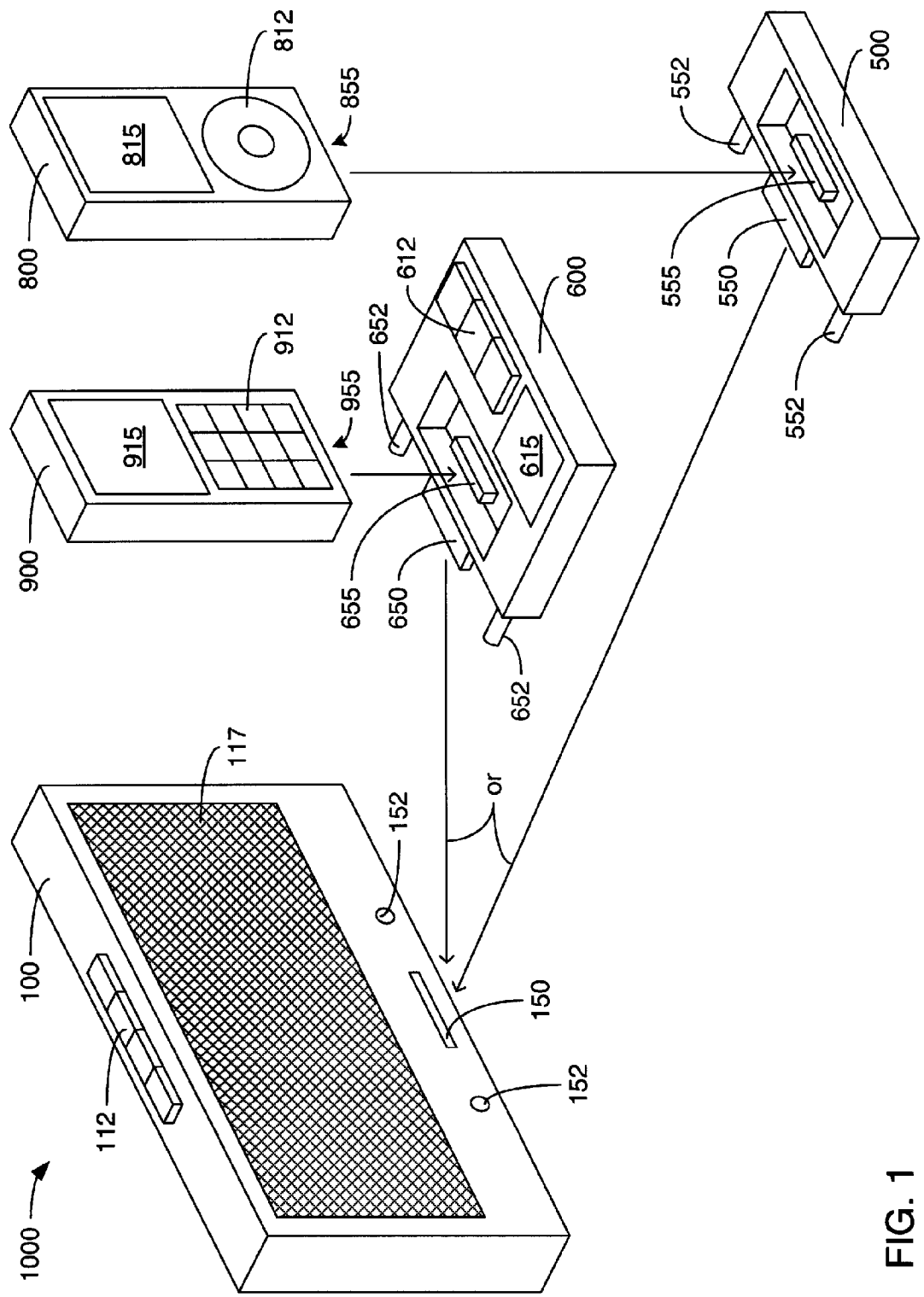
FIG. 1 is an exploded perspective view of an assembly.

FIG. 1 is an exploded perspective diagram of an assembly 1000 made up of a base device 100 and one or the other of docking adapters 500 and 600. As will be explained in greater detail, the base device 100 is able to audibly output audio supplied by one or the other of personal portable devices 800 and 900 with a quality of audio reproduction that neither of the personal portable devices 800 and 900 are able to achieve on their own due to compromises in their designs to accommodate portability. However, the personal portable devices 800 and 900 have docking interfaces 855 and 955 that are sufficiently different, physically and/or electrically, as to make providing the base device 100 with a single interface capable of mating and interacting with both personal portable devices at least impractical, if not impossible. Therefore, the docking adapters 500 and 600 incorporate adapter interfaces 550 and 650, respectively, enabling either of the docking adapters 500 and 600 to be coupled to an adapter interface 150 incorporated into the base device 100. The docking adapters 500 and 600 cooperate with the base device 100 in a manner that will be explained more fully to enable either of the personal portable devices 800 and 900, respectively, to be used with the base device 100 despite having such differences in their docking interfaces 855 and 955. The docking adapter 500 accommodates aspects of the docking interface 855 of the personal portable device 800 that differ from corresponding aspects of the docking interface 955 of the personal portable device 900 that are accommodated by the docking adapter 600.

As depicted, the base device 100 is of a generally similar physical layout to that of the aforementioned SoundDock® series of products, incorporating at least a pair of acoustic drivers 117 to audibly output audio supplied to the base device 100 by either the personal portable device 800 or the personal portable device 900. However, unlike such products, interaction between the base device 100 and either of the personal portable devices 800 or 900 is enabled via docking with one or the other of the docking adapters 500 and 600, respectively. Although not essential in enabling the base device 100 to cooperate with various docking adapters to accommodate the docking of differing personal portable devices, and not necessarily essential to the base device 100 performing the task of audibly outputting audio, the base device 100 is depicted as also incorporating a manually-operable control 112 in the form of a set of manually-operable buttons (although any of a variety of other possible forms of manually-operable controls could be substituted for buttons). The provision of such manually-operable controls may be deemed desirable based on other factors involving the performance of the function of audibly outputting audio, including providing enhanced ease of use over what may be possible with the user interfaces of one or more given personal portable devices.

Each of the docking adapters 500 and 600 are capable of being electrically and mechanically coupled to an adapter interface 150 of the base device 100 via a mating adapter interface 550 and 650, respectively. As will be discussed in greater detail, each of the docking adapters 500 and 600 serves at least as an adapter between an electrical connector of their docking interfaces 555 and 655, respectively, and an electrical connector of their corresponding adapter interfaces 550 and 650. As will also be discussed in greater detail, each of the docking adapters 500 and 600 stores information that is capable of being conveyed through to the base device 100 that enables the base device 100 to automatically alter the configuration of internal circuitry to accommodate electrical characteristics of the adapter interfaces 550 and 650, respectively, to prepare the base device 100 to properly interact with the personal portable devices docked to each of the docking adapters 500 and 600. Further, in some embodiments, each of the docking adapters 500 and 600 are capable of engaging physical couplings 152 of the base device 100 with physical couplings 552 and 652, respectively, to enable each of these docking adapters and their corresponding personal portable devices to be physically supported by the base device 100. In some embodiments, the physical couplings 152 may be implemented as receiving holes formed in a portion of the casing of the base device 100 to receive generally pin-like implementations of the physical couplings 552 and 652, as depicted. However, those skilled in the art will readily recognize that the base device 100 and each of the docking adapters 500 and 600 may be shaped and sized to be physically coupled in any of a variety of ways.

As depicted, the docking adapter 600 incorporates a manually-operable control 612 in the form of a set of manually-operable buttons, and incorporates a visual display 615 of either alphanumeric or dot-matrix form. As is the case with the manually-operable control 112 depicted as incorporated into the base device 100, the incorporation of the manually-operable control 612 and visual display 615 is not necessarily essential to the function of enabling the personal portable device 900 to be interoperable with the base device 100 to at least enable the base device 100 to audibly output audio supplied by personal portable device 900. Such controls or displays as may be provided by the docking adapter 600 may be provided simply to enhance ease of use in performing these or other functions.

Despite the somewhat detailed depictions of specific attributes for each of the personal portable devices 800 and 900, it should be understood that each of the personal portable devices 800 and 900 may be any of a variety of types personal portable devices. This variety of types of personal portable devices includes, and is not limited to, personal data assistants (PDAs), personal information managers (PIMs), personal navigation devices (PNDs), cellular telephones, MP3 audio file players, and MPEG video file players. Therefore, the depictions of the personal portable devices 800 and 900 both having visual displays 815 and 915, respectively, and the depictions of the personal portable device 800 having a manually-operable control 812 in the form of jog dial while the personal portable 900 having a manually-operable control 912 in the form of an array of buttons should not be taken as limiting of the types of personal portable devices that may be supported with various variants of docking adapters.

Figure 2A:
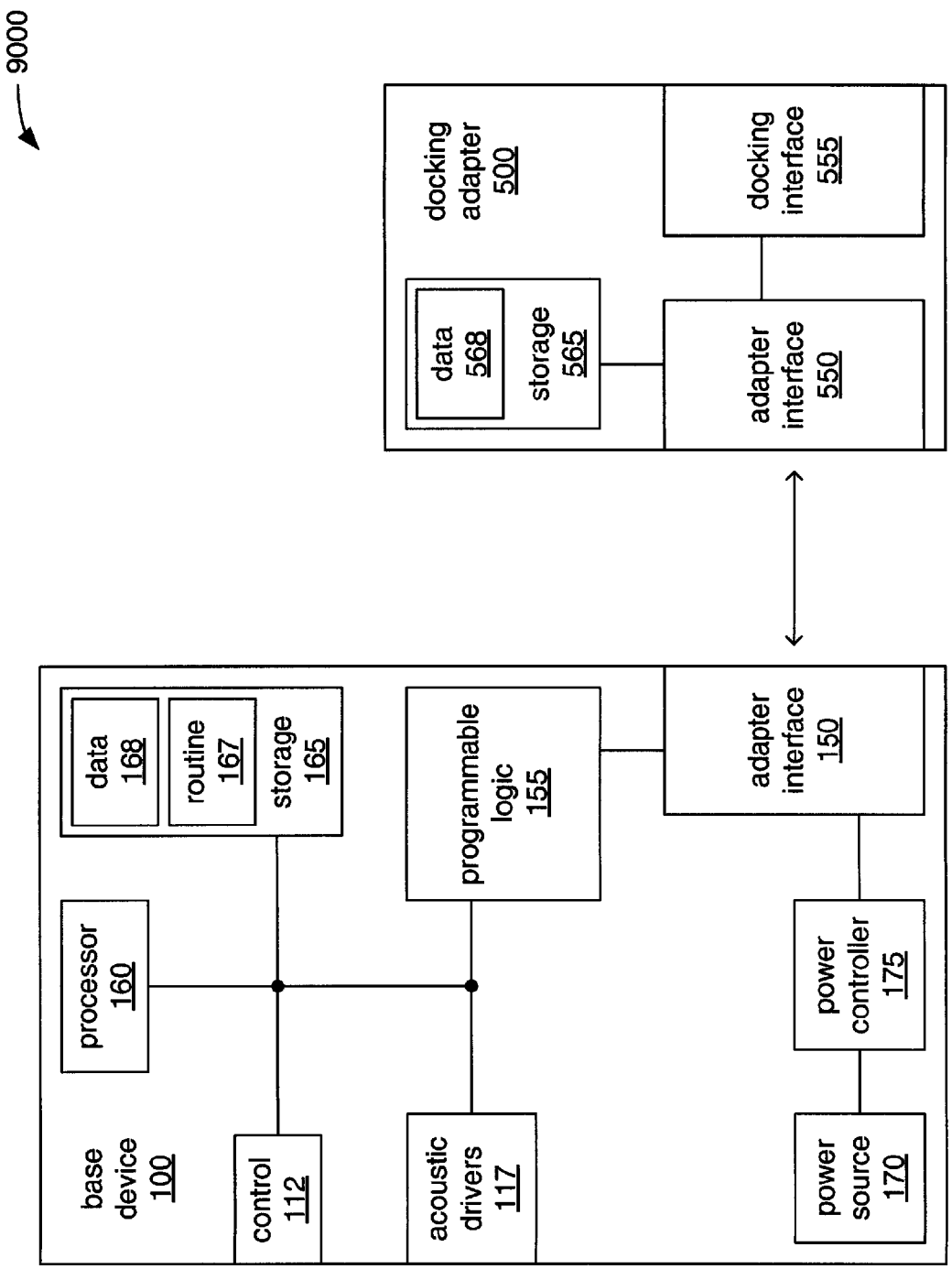
FIGS. 2a, 2b, 2c and 2d are block diagrams of internal architectures employable in the assembly of FIG. 1.

FIG. 2a is a block diagram of an internal architecture 9000 that may be employed by a variant of the assembly 1000 of FIG. 1 that incorporates the base device 100 and the docking adapter 500 to enable the personal portable device 800 to interact with the base device 100 to perform the audio/visual task of audibly outputting audio provided to the base device 100 by the personal portable device 800. It should be noted that despite the selection of the docking adapter 500 for use as an example in this discussion of the internal architecture 9000, the internal architecture 9000 may also be employed by a variant of the assembly 1000 incorporating the docking adapter 600 (or still another docking adapter not shown), instead of the docking adapter 500.

The base device 100 incorporates the acoustic drivers 117, the adapter interface 150 incorporating at least one connector, a programmable logic 155, a processor 160, a storage 165 in which a routine 167 and a data 168 are stored, a power source 170 and a power controller 175. As previously discussed, the base device 100 may further incorporate the manually-operable control 112. The processor 160 has access to the storage 165, the programmable logic 155, the manually-operable control 112 (if present) and the acoustic drivers 117. The docking adapter 500 incorporates the adapter interface 550 incorporating at least one connector capable of mating with the at least one connector of the adapter interface 150 of the base device 100, the docking interface 555 incorporating at least one connector capable of mating with at least one connector of the personal portable device 800, and a storage 565 storing a data 568. The docking interface 555 providing access to a personal portable device docked to the docking adapter 500 and the storage 565 are accessible by the base device 100 through the adapter interface 550 when the base device 100 is coupled to the docking adapter 500 through the adapter interfaces 150 and 550.

The processor 160 is configured to access both the routine 167 and the data 168 within the storage 165, and the routine 167 incorporates a sequence of instructions that when executed by the processor 160, causes the processor 160 to perform various tasks, as will be described. The processor 160 may be any of a variety of types of processing device, including and not limited to, a general purpose processor, a digital signal processor or other more specialized processor having a limited instruction set optimized for a given range of functions, a microcontroller or combinational logic.

Each of the storages 165 and 565 may be based on any of a wide variety of information storage technologies, including and not limited to, static RAM, dynamic RAM, ROM of either erasable or non-erasable form, FLASH, magnetic memory, ferromagnetic disk storage, phase-change storage or magneto-optical storage. It is preferred that the storage 165 be at least partially based on some form of solid-state storage technology, and that at least a portion of that solid-state technology be of a non-volatile nature to prevent loss of the routine 167.

The programmable logic 155 provides a reconfigurable form of interface logic between the processor 160 and whatever personal portable device (such as the personal portable device 800) may be coupled to the base device 100 by way of being docked to a docking adapter (such as the docking adapter 500). It is partially through the reprogrammability of the programmable logic 155, as well as through the interchangeability of docking adapters, that the processor 160 is able to interact with any of a number of personal portable devices to perform an audio/visual task. The programmable logic 155 may be based on any of a variety of technologies by which numerous discrete transistors, inverters, buffers, logic gates, latches, arithmetic logic units (ALUs), universal asynchronous receiver/transmitters (UARTs), network interface controllers (NICs), exclusive-or (XOR) engines, sequencers and/or other circuits that can be alterably interconnected in any of a variety of configurations specified in pieces of configuration data provided to the programmable logic 155. An example of a programmable logic implementing such a technology are various series of field-programmable gate arrays (FPGAs) available from a variety of vendors, including variants that are designed to autonomously read configuration data from an external memory device. Still other examples are complex programmable logic devices (CPLDs) and programmable logic arrays (PLAs). It is typical for such a programmable logic to tri-state its I/O pins and/or for its I/O pins to employ open-collector drivers to prevent damage at times when the programmable logic is powered, but before configuration data has been provided such that the functions of the I/O pins have not yet been set.

The power source 170 provides power for the operation of one or more of the processor 160, the storage 165, the programmable logic 155, the manually-operable control 112 (if present) and the acoustic drivers 17. Additionally, and as will be described in greater detail, the power source 170 provides power to the docking adapter 500 through the power controller and the adapter interfaces 150 and 550 when the base device 100 is coupled to the docking adapter 500 through those adapter interfaces. Also, upon docking of the personal portable device 800 to the docking adapter 500 whilst coupled to the base device 100, the power from the power source 170 is further provided to the personal portable device 800 through the docking interfaces 555 and 855 in order to operate the device 800 and/or recharge a battery in the device 800. The power source 170 may be any of a variety of possible power sources, including and not limited to, a battery, AC mains, and a DC supply provided by another device (not shown) to which the base device 100 is coupled.

Each of the pair of acoustic drivers 117 may be based on any of a variety of technologies, including and not limited to, a piezo-electric element, an electromagnetic speaker, and an electrostatic speaker. Although the base device 100 has been described as having a pair of the acoustic drivers 17, other quantities of acoustic drivers may be incorporated into the base device 100 as part of enabling it to perform the audio/visual task of audibly outputting audio provided by a personal portable device.

To enable the personal portable device 800 to interact with the base device 100 to perform an audio/visual task desired by the user of both devices, the user must couple the docking adapter 500 to the base device 100 and the user must dock the personal portable device 800 with the docking adapter 500. With the coupling of the docking adapter 500 to the base device 100 such that connectors incorporated into each of the adapter interfaces 150 and 550 are mated, the programmable logic 155 is able to be configured for exchanges of electrical signals with both the docking device 500 and for exchanges with the personal portable device 800 through the docking device 500, as will be explained. Then, with the subsequent docking of the personal portable device 800 to the docking adapter 500 such that connectors incorporated into each of the docking interfaces 555 and 855 are mated, electrical connections are established that enable electrical signals to be conveyed between the programmable logic 155 of the base device 100 and the personal portable device 800.

In some embodiments, in response to the coupling of the base device 100 and the docking adapter 500, the programmable logic 155 accesses the storage 565 through the mated connectors of the adapter interfaces 150 and 550 to access the data 568 and retrieve configuration data that specifies the configuration of interconnection to be set within the programmable logic 155 to enable interactions between the processor 160 and the personal portable device 800 through the programmable logic 155. The retrieved configuration data provides the programmable logic 155 with at least a configuration of interconnections that enables signaling with the personal portable device 800 that conforms to timing, signaling and/or protocol requirements of the personal portable device 800. Further, the retrieved configuration data may provide the programmable logic 155 with a configuration of interconnections that defines aspects of a serial interface and/or a parallel interface that the programmable logic 155 must have to enable the conveying of commands and/or data between the base device 100 and the personal portable device 800. The retrieved configuration data may define bit rates, clock rates, data bus widths, queue depths, bus termination, signaling type, cycle delays and/or other characteristics of electrical signaling between the programmable logic 155 and the personal portable device 800.

In other embodiments, in response to the coupling of the base device 100 and the docking adapter 500, the processor 160 is caused by the execution of sequences of instructions of the routine 167 to access the storage 565 through the programmable logic 155 and the mated connectors 150 and 550 to access the data 568 and retrieve configuration data with which to configure interconnections within the programmable logic 155. In these embodiments, the processor 160 may be caused by the routine 167 to have previously programmed the programmable logic 155 with an initial configuration of interconnections sufficient to enable the processor 160 to access the storage 565. Alternatively, the programmable logic 155 may have been previously programmed with such an initial configuration at the time that the base device 100 was created. As those skilled in the art will readily recognize, the programmable logic 155 may be of a type that is capable of being only partially programmed while leaving open the option of being further programmed at a subsequent time, such that the initial configuration is simply augmented with the configuration of interconnections meant to enable interactions between the base device and the personal portable device 800 such that the ability to access the storage 565 is not lost. However, it should be noted that it is also possible that initial configuration may simply be replaced with the configuration of interconnections meant to enable interactions with the personal portable device 800, and such a configuration of interconnections may not provide for the processor 160 accessing the storage 565 since the processor 160 may not subsequently need to do so after accessing the data 568 to possibly retrieve configuration data. Again, the configuration subsequently retrieved by the processor 160 from the data 568 of the storage 565 provides a configuration of interconnections for the programmable logic 155 that enables signaling with the personal portable device 800 that conforms to timing, signaling and/or protocol requirements of the personal portable device 800, as well as possibly defining aspects of a serial interface and/or a parallel interface.

Regardless of the exact manner in which the programmable logic 155 is provided with a configuration of interconnections for digital circuitry, in some embodiments, the programmable logic 155 may further incorporate configurable analog signal routing capabilities to enable the automatic routing of analog signals between the personal portable device 800 and different ones of the acoustic drivers 117 in accordance with a configuration that is also specified by the retrieved configuration data of the data 568. This may entail the automatic routing of different audio channels to different ones of the acoustic drivers 117, and may further entail the automatic combining of audio channels where the quantity or type of audio channels provided as analog signals by the portable device 800 differs in some way from the quantity or type of audio channels able to be supported by the acoustic drivers 117.

In some embodiments, the coupling of connectors of the adapter interfaces 150 and 550 may also result in the power controller 175 being signaled concerning the power requirements of the docking adapter 500 and/or the personal portable device 800 enabling the power controller 175 to adjust the voltage and/or current limit of power supplied by the power source 170 to the docking adapter 500 and/or the personal portable device 800 through the adapter interface 150, accordingly. As those skilled in the art will readily recognize, in the interests of providing power relatively free of spikes and electrical noise, it is likely that the power output of the power controller 175 will be routed directly to a connector of the adapter interface 150 mating with a connector of the adapter interface 550, and then from that connector to a connector of the docking interface 555 with little intervening circuitry within either the base device 100 or the docking adapter 500.

In some embodiments, the coupling of connectors of the adapter interfaces 150 and 550 may entail the selective tying of a subset of the pins of these connectors to high or low voltages as one way for one or both of the base device 100 and the docking adapter 500 to be identified to the other. By way of example, different combinations of such pins of a connector of the adapter interface 550 may be tied to high and low voltages to enable the base device 100 to distinguish the docking adapter 500 from the docking adapter 600. The base device 100 may employ this unique identification of different docking adapters to identify unique capabilities of one docking adapter versus another. Also by way of example, different combinations of such pins of a connector of the adapter interface 150 may be tied to high and low voltages to enable the docking adapter 500 to distinguish the base device 100 from another base device, or to distinguish between different variations of the base device 100. The docking adapter 500 may employ this unique identification of different base devices to select from among different portions of the data 568 to be provided as configuration data to whatever base device to which the docking adapter 500 is coupled. Such a selection of configuration data from among different portions of the data 568 may be necessary to accommodate different capabilities between different base devices. More specifically, where one base device incorporates a microphone to capture audio to be conveyed to the personal portable device 800, and another base device does not, different configurations of interconnections within the programmable logic of each of these base devices (and therefore, different selections of configuration data from the data 568) may be required. Alternatively, such a selection of configuration data from among different portions of the data 568 may be necessary to accommodate different variations of the base device 100 having different forms of the programmable logic 155. More specifically, where a newer variation of the base device 100 employs an improved variation of the programmable logic 155 that is not employed by an older variation of the base device 100, different configurations of interconnections within the programmable logic of each of these variants of the base device 100 (and therefore, different selections of configuration data from the data 568) may be required.

In response to the adapter interfaces 150 and 550 being coupled, and in response to the configuration of interconnections within the programmable logic 155, the processor 160 accesses the storage 165 to read and execute a sequence of instructions of the routine 167 to begin interacting with the personal portable device 800 through the programmable logic 155 and the docking adapter 500 to perform the audio/visual task of audibly outputting audio provided by the personal portable device 800. In some embodiments, the processor 160 may be caused by the routine 167 to respond to information concerning the identity of the docking adapter 500 and/or the personal portable device 800 by reading the data 168 within the storage 165 to retrieve information concerning aspects of the interaction between the processor 160 and the personal portable device 800 that are affected by the identity of either the docking adapter 500 or the personal portable device 800.

Figure 2B:
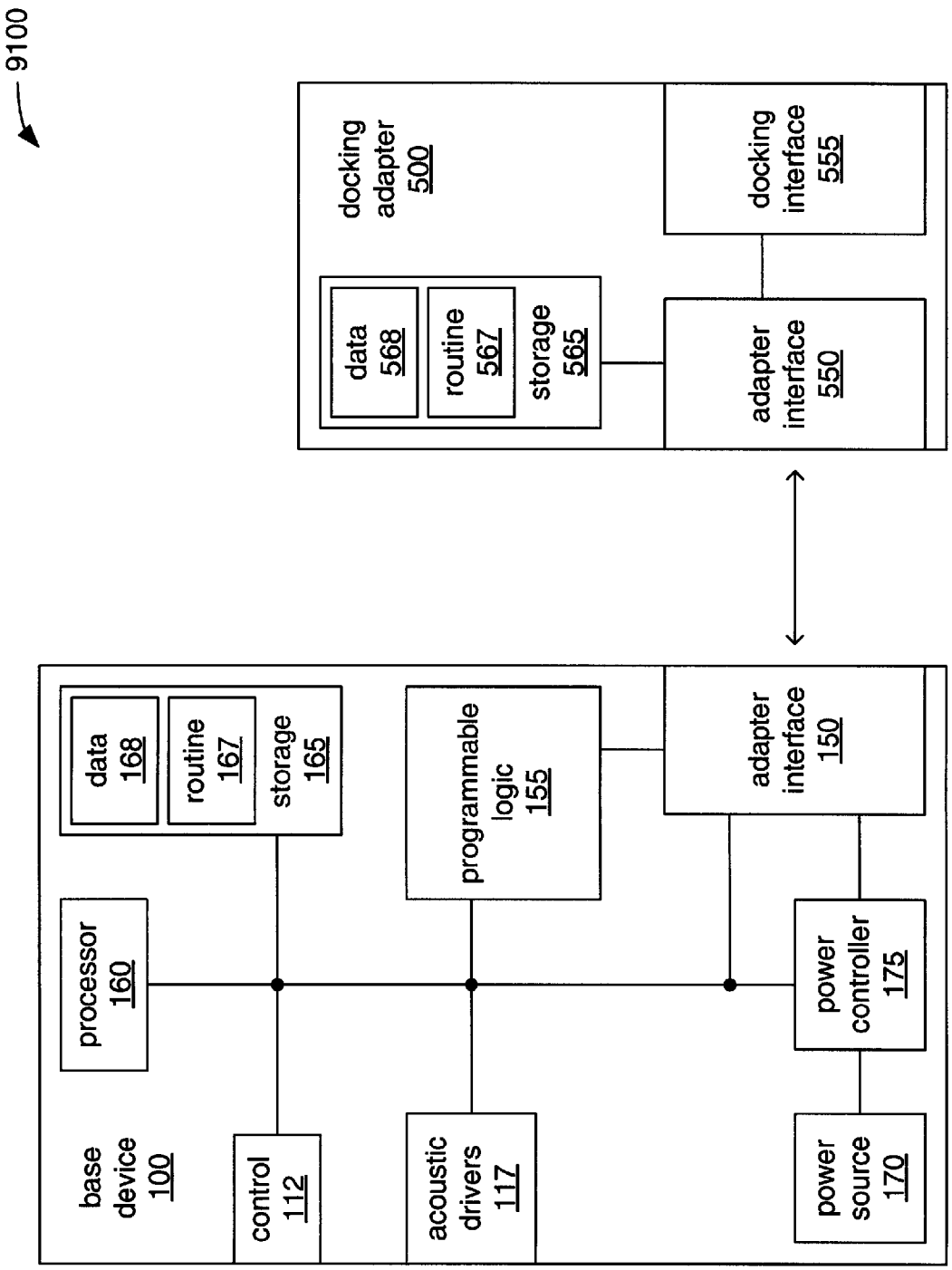

FIG. 2b is a block diagram of another internal architecture 9100 that may be employed by a variant of the assembly 1000 of FIG. 1 that incorporates the base device 100 and the docking adapter 500 to enable the personal portable device 800 to interact with the base device 100 to perform the audio/visual task of audibly outputting audio provided to the base device 100 by the personal portable device 800. Again, despite the selection of the docking adapter 500 for use as an example in this discussion of the internal architecture 9100, the internal architecture 9100 may also be employed by a variant of the assembly 1000 incorporating the docking adapter 600 (or still another docking adapter not shown), instead of the docking adapter 500. The internal architecture 9100 is substantially similar to the internal architecture 9000 of FIG. 2a, with substantial differences being the manner in which the interconnections within the programmable logic 155 are configured and the manner in which characteristics of the power output of the power controller 175 are set. While the processor 160 of the internal architecture 9000 was largely uninvolved in the configuration of interconnections within the programmable logic 155 and the setting of characteristics of power output of the power controller 175, the processor 160 of the internal architecture 9100 is caused to be directly involved in both. However, due to the numerous substantial similarities between the internal architectures 9000 and 9100, corresponding elements have been designated with identical numerical labels.

Not unlike the base device 100 of the internal architecture 9000, the base device 100 of the internal architecture 9100 incorporates the acoustic drivers 117, the adapter interface 150 incorporating at least one connector, a programmable logic 155, a processor 160, a storage 165 in which a routine 167 and a data 168 are stored, a power source 170 and a power controller 175. Again, the base device 100 may further incorporate a manually operable control 112. Not unlike the processor 160 of the internal architecture 9000, the processor 160 of the internal architecture 9100 has access to the storage 165, the programmable logic 155, the manually-operable control 112 (if present) and the acoustic drivers 117. However, the processor 160 of the internal architecture 9100 also has more direct access to the adapter interface 150 and the power controller 175 than is available to the processor 160 of the internal architecture 9000 through the programmable logic 155.

Not unlike the docking adapter 500 of the internal architecture 9000, the docking adapter 500 of the internal architecture 9100 incorporates the adapter interface 550 incorporating at least one connector capable of mating with the at least one connector of the adapter interface 150 of the base device 100, the docking interface 555 incorporating at least one connector capable of mating with at least one connector of the personal portable device 800, and a storage 565 storing a data 568. Again, the docking interface 555 providing access to a personal portable device docked to the docking adapter 500 and the storage 565 are accessible by the base device 100 through the adapter interface 550 when the base device 100 is coupled to the docking adapter 500 through the adapter interfaces 150 and 550. However, the storage 565 of the internal architecture 9100 also stores a routine 567.

The processor 160, the storages 165 and 565, the power source 170 and the programmable logic 155 may each, again, be based on any of a variety of possible technologies. Like the storage 165, it is preferred that the storage 565 be at least partially based on some form of solid-state storage technology, and that at least a portion of that solid-state technology be of a non-volatile nature to prevent loss of the routine 567. Again, the programmable logic 155 provides a reconfigurable form of interface logic between the processor 160 and whatever personal portable device (such as the personal portable device 800) may be coupled to the base device 100 by way of being docked to a docking adapter (such as the docking adapter 500). And again, it is partially through the reprogrammability of the programmable logic 155, as well as through the interchangeability of docking adapters, that the processor 160 is able to interact with any of a number of personal portable devices to perform an audio/visual task.

In some embodiments, the processor 160 is caused by the routine 167 to respond to the coupling of the docking adapter 500 to the base device 100 by performing one or more tests to identify the docking adapter 500. This may be done in order to determine whether or not the docking adapter 500 is a docking adapter for which appropriate configuration data is available to the processor 160 as part of the data 168, and whether or not the docking adapter 500 is a docking adapter for which the routine 167 provides a sequence of instructions to perform the audio/visual task of audibly outputting audio provided to the base device 100 through the docking adapter 500. Having the processor 160 perform such a test may be deemed desirable to enable the provision of at least some forms of docking adapter that do not incorporate a storage 565, at all, in an effort to minimize costs of such docking adapters and variants of the assembly 1000 in which they are used. By way of example, it may be that the base device 100 is provided with sufficient information stored within the storage 165 to be able to interoperate with a number of different docking adapters existing at the time that the base device 100 is created, as well as being provided with the ability to identify newer docking adapters created at a time after the base device 100 was created so as to identify when it is necessary to employ information stored in a storage within those newer docking adapters. In this way, newer docking adapters created at a later time to support docking with newer personal portable devices may be created and coupled to the base device 100 without having to make alterations to the base device 100.

Such a test of the docking adapter 500 performed by the processor 160 may take any of a number of forms. In some embodiments, a connector of the adapter interface 550 uniquely identifies the docking adapter 500 to the base device 100 and/or otherwise signals the base device 100 that the docking adapter 500 incorporates the storage 565 through tying some of the contacts of that connector to one of several possible combinations of high and low voltage levels. By way of example, three contacts of that connector may be employed by different variants of the docking adapter 500 to provide different 3-bit binary codes to the base device, wherein at least some of those codes provide a unique identifier for each of a few of the variants of the docking adapters that do not incorporate the storage 565, and at least one of those codes signals the base device 100 that a particular variant of the docking adapter 500 is newer than other variants and/or incorporates the storage 565. In other embodiments, the processor 160 tests for the presence of a storage 565 by attempting to access it through the adapter interfaces 150 and 550, and if the processor 160 detects the storage 565, the processor 160 may then access a portion of the data 568 to retrieve an identifying code that identifies the specific variant of the docking adapter 500.

Regardless of how or when the processor 160 is caused to identify the specific variant of the docking adapter 500, such identification is important to enabling proper interoperability between the base device 100 and the docking adapter 500, and ultimately, enabling proper interoperability between the base device 100 and the personal portable device 800 through the docking adapter 500. This identification aids the processor 160 in selecting an appropriate configuration data to provide to the programmable logic 155 to enable a communications between the processor 160 and the personal portable device 800, and which sequences of instructions to execute in performing that communication. While the docking adapter 500 provides a correct physical interconnection and a correct routing of electrical connections between the base device 100 and the personal portable device 800, it is the selection of configuration data providing a configuration of interconnections for the programmable logic 155 and the selection of a sequence of instructions for execution by the processor 160 that makes possible the effective use of what is provided by the docking adapter 500.

In some embodiments where the docking adapter 500 incorporates the storage 565, the processor 160 performs one or more tests for multiple versions of configuration data and/or sequences of instructions supporting interoperability between the base device 100 and the docking adapter 500 within the storages 165 and 565. If multiple versions are found, the processor 160 may further employ information identifying each of the versions to select the most recent version of configuration data for use in configuring interconnections within the programmable logic 155 and/or the most recent sequence of instructions in performing communications with the personal portable device 800 when docked with the docking adapter 500. By way of example, the storage 565 may store a portion of the data 568 and/or a portion of the routine 567 that are improved versions of configuration data and/or a sequence of instructions over corresponding configuration data and/or sequences of instructions stored in the storage 165 as portions of the data 168 and/or the routine 167, respectively. This may come about as a result of there being discovered to be a need to improve upon configuration data and/or a sequence of instructions at a time after the base device 100 was created, and the incorporation of the storage 565 into the docking adapter 500 may be a way to provide the base device with those improvements upon the coupling of the docking adapter 500 to the base device 100. In some variations of these embodiments, the processor 160 may be caused by the routine 167 to take advantage of detecting newer versions of configuration data and/or sequences of instructions by replacing an older versions in one or the other of the storages 165 and 565 with the newer versions.

Also, in some embodiments where the docking adapter 500 incorporates the storage 565, the data 568 and/or the routine 567 may each be made up of multiple portions meant to support the use of the docking adapter 500 with base devices other than the base device 100 and/or the use of the docking adapter 500 with different variants of the base device 100. Where the docking adapter 500 is meant to be used with either the base device 100 or another base device enabling a different range of audio/visual tasks, those differences may be accommodated by the data 568 having different portions that each provide configuration data for the programmable logic of each different base device, and/or accommodated by the routine 567 having different sequences of instructions for execution by the processors of each different base device. As those skilled in the art will readily recognize, where two different base devices support considerably different audio/visual tasks, one base device may incorporate a more capable processor and/or a more complex programmable logic than the other. Similarly, where the docking adapter 500 is meant to be used with different variants of the docking device 100 where one variant may be of a newer design incorporating various improvements over the other, those differences may be accommodated by the data 568 having different portions that each provide a different configuration data for the programmable logic of each variant of the base device 100, and/or accommodated by the routine 567 having different portions that each provide a different sequence of instructions for execution by the processors of each variant of the base device 100. As those skilled in the art will readily recognize, it is commonplace for a manufactured product to undergo various modifications in design over time to take advantage of opportunities to reduce costs, to accommodate changes made by suppliers of components, and/or for other reasons. Indeed, one variant of a given product may have an external appearance and range of functionality that are entirely identical to another variant created years later, and yet, the internal designs of the two variants may be considerably different.

In some embodiments, following the selection of an appropriate configuration data to be provided to the programmable logic 155, and following the selection of an appropriate sequence of instructions for execution by the processor 160 in performing the audio/visual task of audibly outputting audio provided by the personal portable device 800, the processor 160 is caused by that selected sequence of instructions to respond to the docking of the personal portable device 800 by performing a test to identify the personal portable device 800. As those skilled in the art will readily recognize, the docking adapter 500 may be capable of accepting any one of multiple different personal portable devices being docked with it, and although this may be the result of there being multiple personal portable devices of a common vendor and/or similar design, each of those personal portable devices may possess unique characteristics in their docking interfaces that necessitate slight differences in how the base device 100 must interact with them to ensure interoperability. Therefore, upon identifying the personal portable device 800, the processor 160 may select from among different portions of the selected sequence of instructions to be executed in interacting with the personal portable device 800 and/or the processor 160 may in some way adjust the configuration of interconnections within the programmable logic 155 that were specified by the selected configuration data.

Figure 2C:
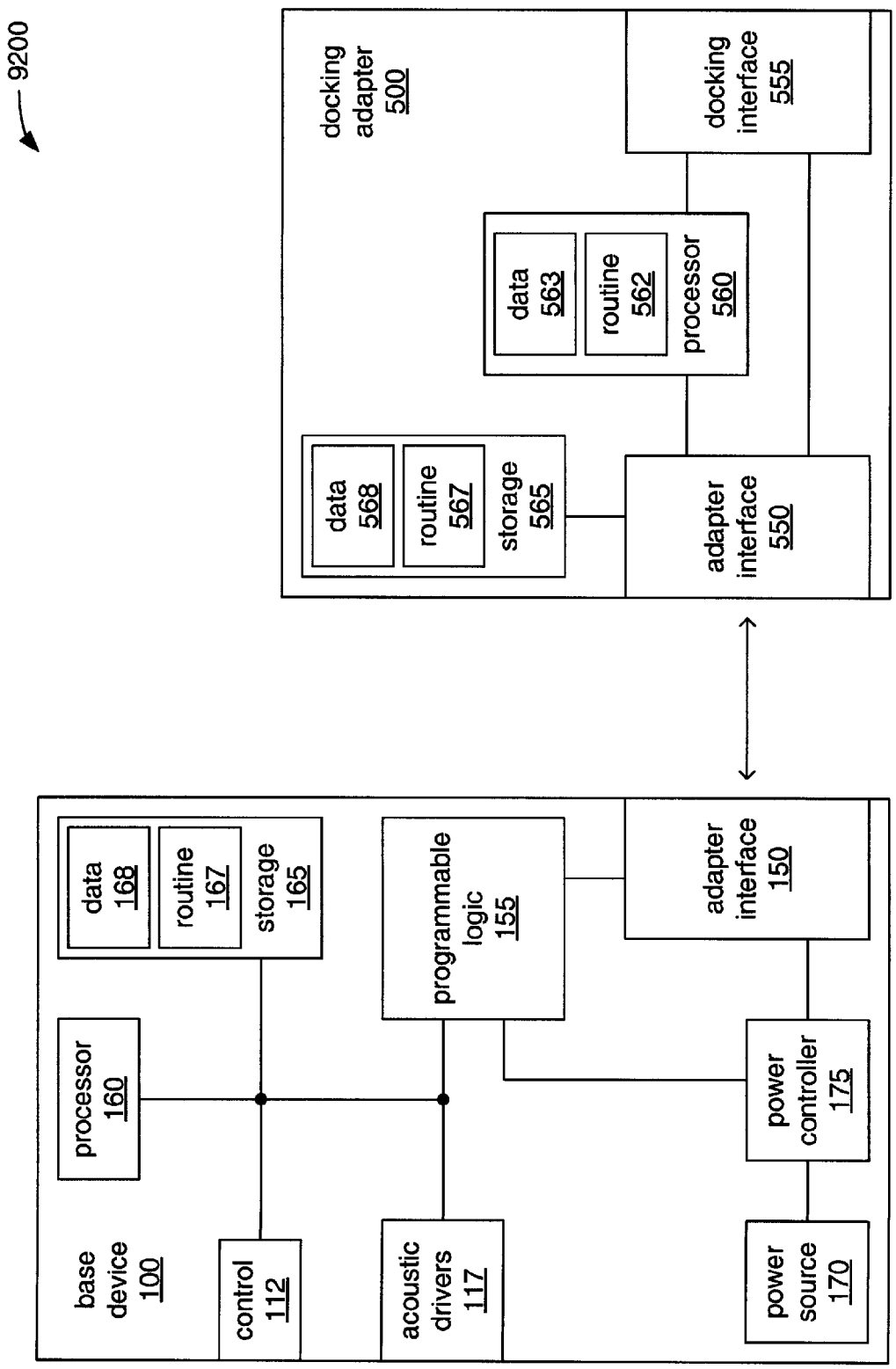

FIG. 2c is a block diagram of still another internal architecture 9200 that may be employed by a variant of the assembly 1000 of FIG. 1 that incorporates the base device 100 and a docking adapter 500 to enable a personal portable device to interact with the base device 100 to perform the audio/visual task of audibly outputting audio provided to the base device 100. Again, the docking adapter 500 enabling the docking of the personal portable device 800 is used as an example in this discussion of the internal architecture 9200. The internal architecture 9200 is substantially similar to the internal architecture 9000 of FIG. 2a, with a substantial difference being the incorporation of an independent processor in the docking adapter 500. However, due to the numerous substantial similarities between the internal architectures 9000 and 9200, corresponding elements have been designated with identical numerical labels.

Not unlike the base device 100 of the internal architecture 9000, the base device 100 of the internal architecture 9200 incorporates the acoustic drivers 117, the adapter interface 150 incorporating at least one connector, a programmable logic 155, a processor 160, a storage 165 in which a routine 167 and a data 168 are stored, a power source 170, a power controller 175, and possibly, a manually operable control 112. Not unlike the processor 160 of the internal architecture 9000, the processor 160 of the internal architecture 9200 has access to the storage 165, the programmable logic 155, the manually-operable control 112 (if present) and the acoustic drivers 117. However, unlike the programmable logic 155 of the earlier internal architectures, the programmable logic 155 of the internal architecture 9200 has more direct access to the power controller 175.

Not unlike the docking adapter 500 of the internal architecture 9100, the docking adapter 500 of the internal architecture 9200 incorporates the adapter interface 550 incorporating at least one connector capable of mating with the at least one connector of the adapter interface 150 of the base device 100, the docking interface 555 incorporating at least one connector capable of mating with at least one connector of the personal portable device 800, and a storage 565 storing a routine 567 and a data 568. Once again, the docking interface 555 providing access to a personal portable device docked to the docking adapter 500 and the storage 565 are accessible by the base device 100 through the adapter interface 550 when the base device 100 is coupled to the docking adapter 500 through the adapter interfaces 150 and 550. However, the docking adapter 500 of the internal architecture 9200 also incorporates an embedded processor 560 at least partially interposed between the adapter interface 550 and the docking interface 555 to aid in translating signals and/or protocols therebetween. The processor 560 has an internal storage capability by which the processor 560 independently stores a routine 562 made up of sequences of instructions that are executable by the processor 560, as well as a data 563.

The processor 160, the storages 165 and 565, the power source 170 and the programmable logic 155 may each, again, be based on any of a variety of possible technologies, as may also be the processor 560. Again, the programmable logic 155 provides a reconfigurable form of interface logic between the processor 160 and whatever personal portable device (such as the personal portable device 800) may be coupled to the base device 100 by way of being docked to a docking adapter (such as the docking adapter 500). However, the processor 560, in executing sequences of instructions of the routine 562, cooperates with the programmable logic 155 to assist in enabling interactions between the processor 160 and the personal portable device 800 to perform an audio/visual task. Indeed, the programmable logic 155 may be employed to provide a reconfigurable form of interface logic between the processor 160 and the processor 560 to enable cooperation therebetween.

In some embodiments, the provision of the processor 560 within the docking adapter 500 of the internal architecture 9200 may be deemed desirable and/or necessary due to complexities in interfacing to a given form of the personal portable device 800 that do not exist with other personal portable devices such that the combination of the programmable logic 155, the processor 160 and the storage 165 is not sufficient in processing ability and/or storage capacity to accommodate those complexities. By way of example, at a time after the creation of the base device 100, a form of the personal portable device 800 may be introduced having a docking interface 855 with a data transfer rate too fast and/or a communications protocol too complex to be successfully coped with by the base device 100. The processor 560 may, therefore, assist the processor 160 by offloading some of the processing needed to respond quickly enough to accommodate a faster transfer rate or more complex protocol.

Figure 2D:
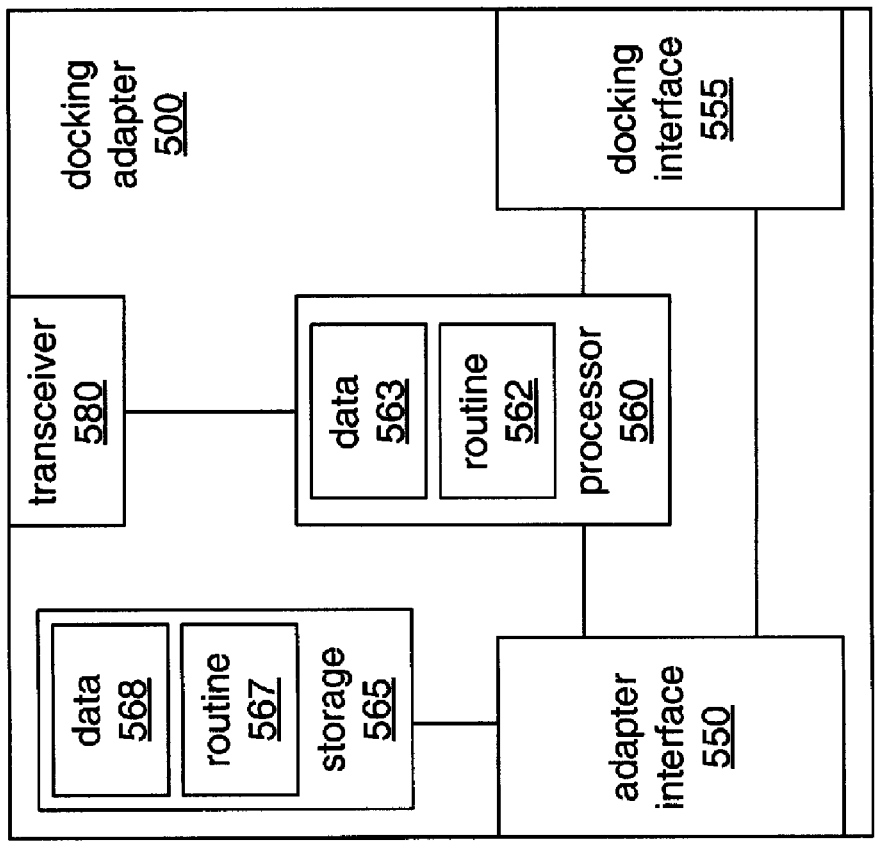

Indeed, FIG. 2d illustrates a specific situation in which the addition of the processor 560 may be necessary to address complexities in protocol and/or data transfers in wireless communications with the personal portable device 800, in addition to (or in place of) interactions through a docked connection with the personal portable device 800. Some forms of the personal portable device 800 may be capable of interacting across a point-to-point wireless link with another device to perform an audio/visual task. The docking adapter 500 of FIG. 2d employs a similar internal architecture to that of the docking adapter 500 of FIG. 2c, but with the addition of a transceiver 580, employing radio frequency, infrared, ultrasonic or other wireless communications technology to interact with the personal portable device 800 when the personal portable device 800 is not docked with the docking adapter 500 such that the docking interfaces 555 and 855 are not coupled. In some embodiments, configuration of the docking adapter 500 and of the personal portable device 800 necessary to engage in point-to-point wireless communications via the transceiver 580 may be carried out while the personal portable device 800 is docked with the docking adapter 500. The docking adapter 500 may further serve to recharge a battery of the personal portable device 800 when so docked. Alternatively, and though not specifically shown, a variant of the docking adapter 500 of FIG. 2d may incorporate the transceiver 580 in place of the docking interface 555, such that the personal portable device 800 and the docking adapter 500 are never docked with each other. In such a variant, the programmable logic 155 continues to provide a reconfigurable form of interface logic between the processor 160 and various docking adapters to which a personal portable device may be docked, but would also provide a reconfigurable form of interface logic between the processor 160 and whatever form of the processor 560 might be required to support operation of the transceiver 580 in communicating across a point-to-point wireless link with the personal portable device 800.

In other embodiments, the provision of the processor 560 within the docking adapter 500 of the internal architecture 9200 may be deemed desirable and/or necessary due to encryption or other security requirements in the transfer of data required by a given form of the personal portable device 800. By way of example, the processor 560 may be a component of an encryption/decryption or security key system that must be found by the personal portable device 800 to be in place before a particular piece of data will be provided by the personal portable device 800 in digital form as part of cooperating with the base device 100 to perform an audio/visual task.

As those skilled in the art will readily recognize, the processor 560 may be implemented as a configuration of interconnections between pieces of digital circuitry within a programmable logic (not specifically shown) carried by the docking adapter 500. Indeed, in still other embodiments, a programmable logic to simply augment the programmable logic 155 may be carried by the docking adapter 500 in place of the depicted processor 560. In such embodiments, the provision of a configuration of interconnections to the programmable logic 155 may entail an accompanying provision of configuration of interconnections to such a programmable logic within the docking adapter 500. As those skilled in the art will readily recognize, multiple individual pieces of programmable logic (often implemented in packaged integrated circuit form) may be grouped together where a single such piece of programmable logic is insufficient.

Not unlike what has been variously described with regard to the internal architectures 9000 and 9100, in response to the coupling of the docking adapter 500 to the base device 100, either the processor 160 may access the data 568 of the storage 565 of the docking adapter 500 to retrieve configuration data to be provided to the programmable logic 155, or the programmable logic 155 may do so, itself. Further, the processor 160 may perform one or more tests to identify the docking adapter 500 and/or the personal portable device 800 to determine which of multiple possible pieces of configuration data and/or sequences of instructions within the storages 165 and 565 are to be selected to support interoperability between the base device 100 and one or both of the docking adapter 500 and the personal portable device 800.

However, unlike what has been described with regard to the internal architectures 9000 and 9100, the programmable logic 155 operates the power controller 175 to control the characteristics of the electric power provided by the power source 170 to the docking adapter 500 and the personal portable device 800. In other words, the characteristics of such power are controllable as part of the configuration of interconnections provided to the programmable logic 155, along with the digital interfacing characteristics that are also controllable in the same way. Again, those skilled in the art will readily recognize that the ability of some possible forms of the programmable logic 155 to be only partially programmed enables the processor 160 to provide the programmable logic 155 with a configuration of interconnections that may be limited to what may be needed to operate the power controller 175, although such a limited configuration may include what is necessary to access the storage 565, as has been previously discussed.

In the cases of all three of the internal architectures 9000, 9100 and 9200, with the personal portable device 800 docked with the docking adapter 500, and with the necessary selecting of configuration data and/or routines accomplished, the base device 100 is ready to interact with the personal portable device 800 through the docking adapter 500 to perform the audio/visual task of audibly outputting audio provided to the base device 100 by the personal portable device 800 as directed by the user of both devices.

Figure 3:
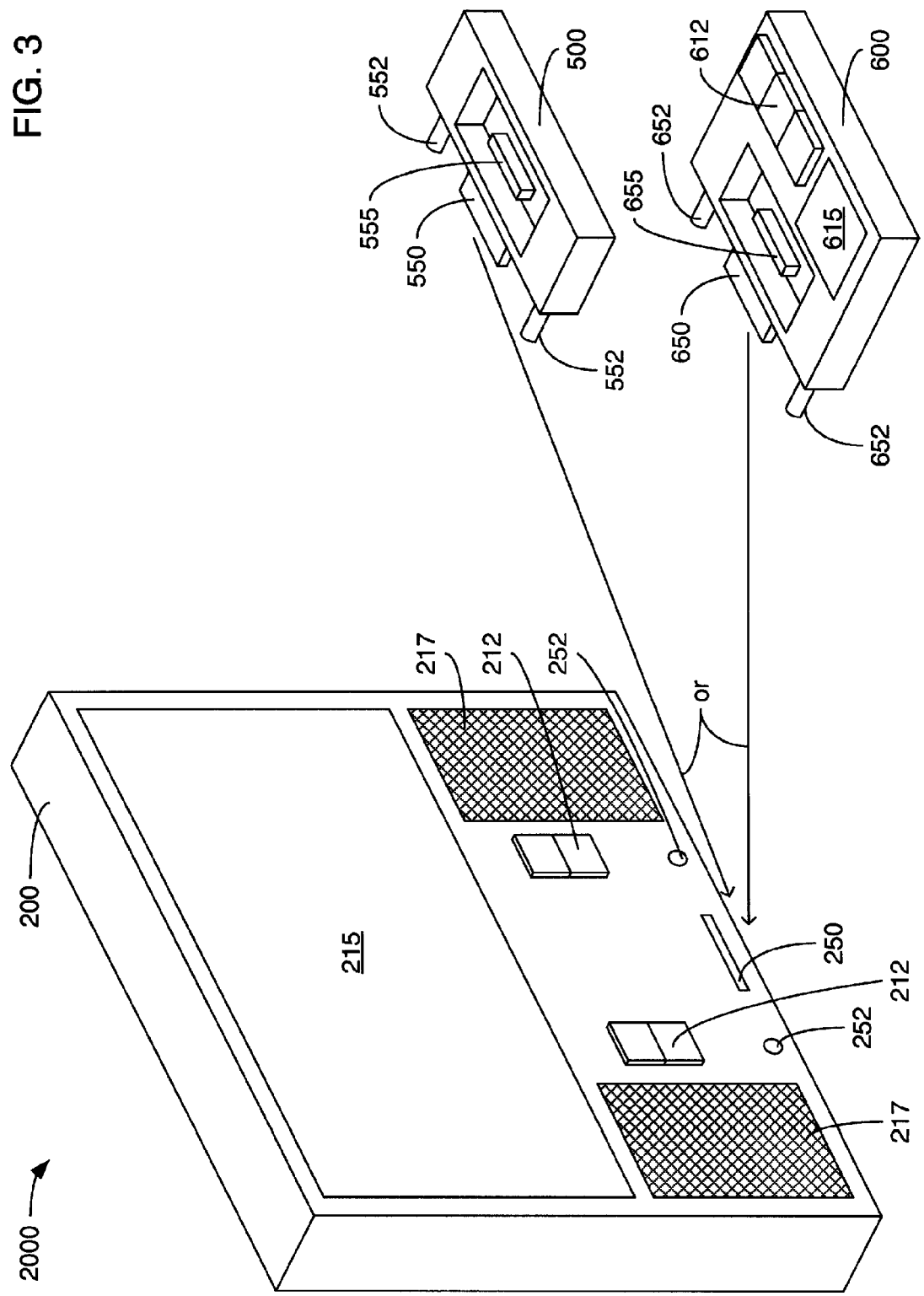
FIG. 3 is an exploded perspective view of another assembly.

FIG. 3 is an exploded perspective diagram of an assembly 2000 made up of a base device 200 and one or the other of docking adapters 500 and 600. Not unlike the base device 100 of the assembly 1000 of FIG. 1, the base device 200 cooperates with at least one or the other of the docking adapters 500 and 600 to enable the base device 200 to cooperate with differing personal portable devices to perform an audio/visual task. However, while the base device 100 of the assembly 1000 did not display visual imagery provided by a personal portable device, the base device 200 further incorporates a visual device 215 to do so in addition to having multiple acoustic drivers 217 to audibly output audio. As a result, the base device 200 is capable of cooperating with a personal portable device (through an appropriate one of the docking adapters 500 and 600, or still another docking adapter not shown) to audibly output audio provided by the personal portable device via the acoustic drivers 217, to visually display visual imagery provided by the personal portable device via the visual display 215, or to do both.

The docking adapters 500 and 600 of the assembly 2000 are substantially similar in numerous ways to the docking adapters 500 and 600 of the assembly 1000. Due to these numerous similarities, corresponding elements of the docking adapters 500 and 600 of the assembly 2000 have been designated with identical numerical labels to those of the docking adapters 500 and 600 of the assembly 1000. Indeed, in some embodiments of the assemblies 1000 and 2000, the docking adapters 500 and 600 of both assemblies may be one and the same such that both docking adapters are interchangeable with both of the base devices 100 and 200. Further, due to numerous other similarities between the assemblies 1000 and 2000, corresponding elements of the base devices 100 and 200 have been designated with similar 1xx and 2xx numerical labels.

In a manner not unlike the base device 100 of FIG. 1, the base device 200 incorporates an adapter interface 250 incorporating at least one connector to enable an electrical coupling with at least one mating connector incorporated into either of the adapter interfaces 550 and 650 of the docking adapters 500 and 600, respectively. Also not unlike the base device 100, the base device 200 may incorporate physical couplings 252 to engage corresponding physical couplings 552 and 652 of the docking adapters 500 and 600, respectively, to provide physical support. Further, not unlike the base device 100, the base device 200 may additionally incorporate a manually-operable control 212 to enable a user of the assembly 2000 to control various aspects of one or more of the audio/visual tasks that the base device 200 is capable of cooperating with a personal portable device to perform. Again, although the manually-operable control 212 is depicted as being a set of buttons, the manually-operable control 212 may take any of a variety of forms.

Figure 4:
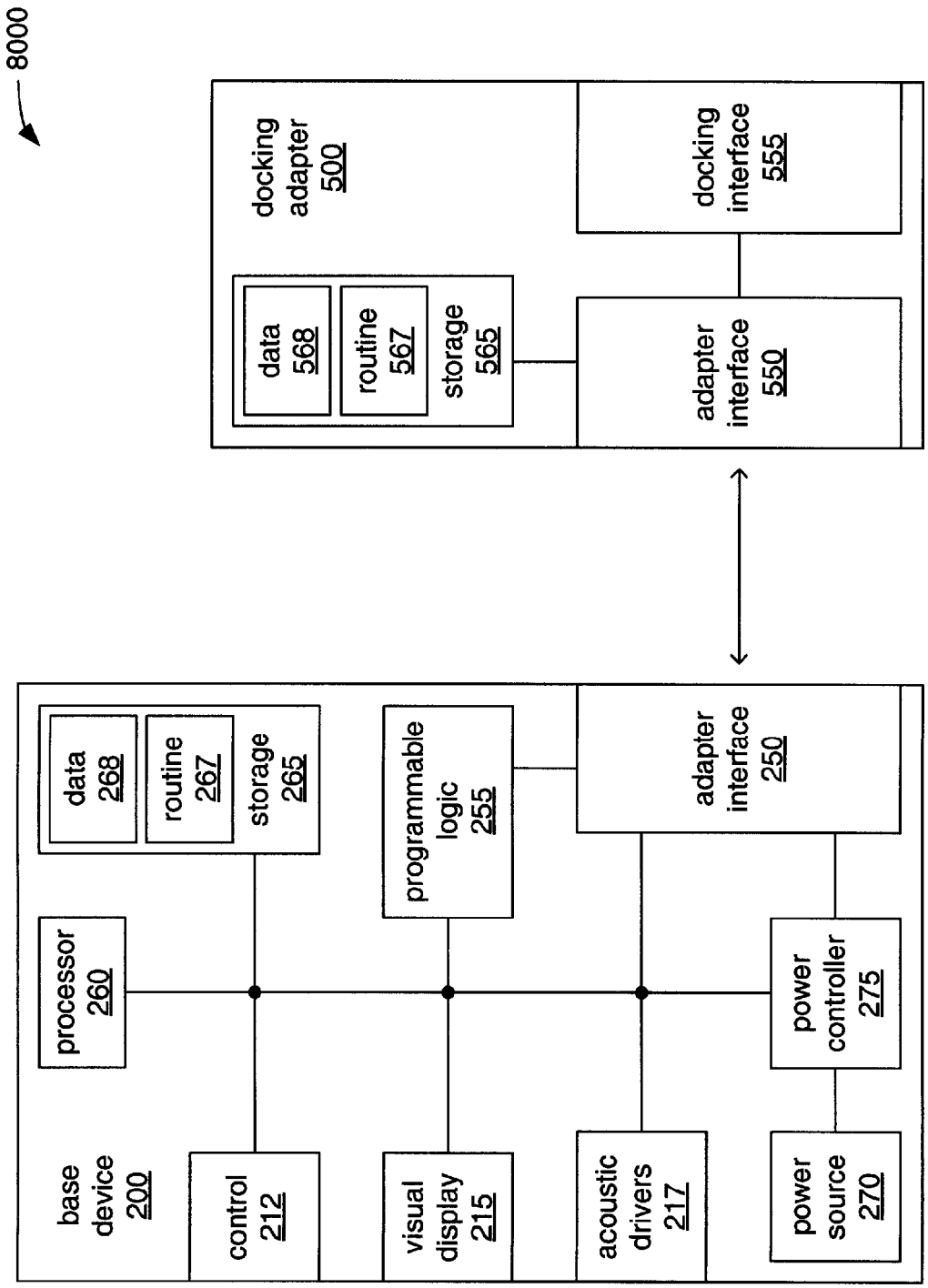
FIG. 4 is a block diagram of an internal architecture employable in the assembly of FIG. 3.

FIG. 4 is a block diagram of an internal architecture 8000 that may be employed by a variant of the assembly 2000 of FIG. 3 that incorporates the base device 200 and the docking adapter 500 to enable a personal portable device to interact with the base device 200 to perform the audio/visual task of audibly outputting audio provided by a personal portable device, the audio/visual task of visually displaying video provided by a personal portable device, or the audio/visual task of both audibly outputting audio and visually displaying video provided by a personal portable device. Again, despite the selection of the docking adapter 500 for use as an example in this discussion, the internal architecture 8000 may also be employed by a variant of the assembly 2000 incorporating the docking adapter 600 (or still another docking adapter not shown), instead of the docking adapter 500. The internal architecture 8000 is substantially similar to the internal architecture 9100 of FIG. 2b, though with a substantial difference being the additional incorporation of the visual display 215 into the base device 200 to augment the acoustic drivers 217 to enable the performance of additional audio/visual tasks. Due to numerous similarities between the internal architectures 9100 and 8000, corresponding elements of the docking adapters 500 and 600 have been designated with identical numerical labels, and corresponding elements of the base devices 100 and 200 have been designated with similar 1xx and 2xx numerical labels.

In a manner not unlike the base device 100 of the internal architecture 9100, the base device 200 of the internal architecture 8000 incorporates the visual display 215, one or more acoustic drivers 217 (preferably, at least a pair of the acoustic drivers 217), the adapter interface 250 incorporating at least one connector, a programmable logic 255, a processor 260, a storage 265 in which a routine 267 and a data 268 are stored, a power source 270 and a power controller 275. The base device 200 may further incorporate the manually operable control 212. Not unlike the processor 160 of the internal architecture 9100, the processor 260 of the internal architecture 8000 has access to the storage 265, the programmable logic 255, the manually-operable control 212 (if present), the acoustic drivers 217, the adapter interface 250 and the power controller 275. Further, the processor 260 also has access to the visual display 215.

Not unlike the docking adapter 500 of the internal architecture 9100, the docking adapter 500 of the internal architecture 8000 incorporates the adapter interface 550 incorporating at least one connector capable of mating with the at least one connector of the adapter interface 250 of the base device 200, the docking interface 555 incorporating at least one connector capable of mating with at least one connector of a personal portable device, and a storage 565 storing a data 568 and a routine 567. Also, the docking interface 555 providing access to a personal portable device docked to the docking adapter 500 and the storage 565 are accessible by the base device 200 through the adapter interface 550 when the base device 200 is coupled to the docking adapter 500 through the adapter interfaces 250 and 550.

The processor 260, the storages 265 and 565, the power source 270 and the programmable logic 255 may each, again, be based on any of a variety of possible technologies. Further, the visual display 215 may also be based on any of a variety of technologies, including and not limited, liquid crystal display (LCD) technology, gas plasma, and electroluminescent. Not unlike the programmable logic 155 of the internal architecture 9100, the programmable logic 255 provides a reconfigurable form of interface logic between the processor 260 and whatever personal portable device may be coupled to the base device 200 by way of being docked to a docking adapter (such as the docking adapter 500). It is partially through the reprogrammability of the programmable logic 255, as well as through the interchangeability of docking adapters, that the processor 260 is able to interact with any of a number of personal portable devices to perform an audio/visual task.

Not unlike the processor 160 of the internal architecture 9100, the processor 260 is caused by the routine 267 to variously perform tests to identify the docking adapter 500, tests to identify a personal portable device docked with the docking adapter 500, compare portions of the data 268 and the data 568 to select configuration data, and/or compare portions of the routine 267 and the routine 567 to select a sequence of instructions to be executed by the processor 260. Further, the processor 260, not unlike the processor 160, may rely on the tying of pins of one or more connectors to high or low voltages and/or stored sequences of values in performing such tests and selecting such configuration data and/or sequences of instructions.

With a personal portable device docked with a docking adapter coupled to the base device 200, and with the necessary selecting of configuration data and/or sequences of instructions accomplished, the base device 200 is ready to interact with that personal portable device through that docking adapter to perform an audio/visual task as directed by the user of both devices.

Figure 5:
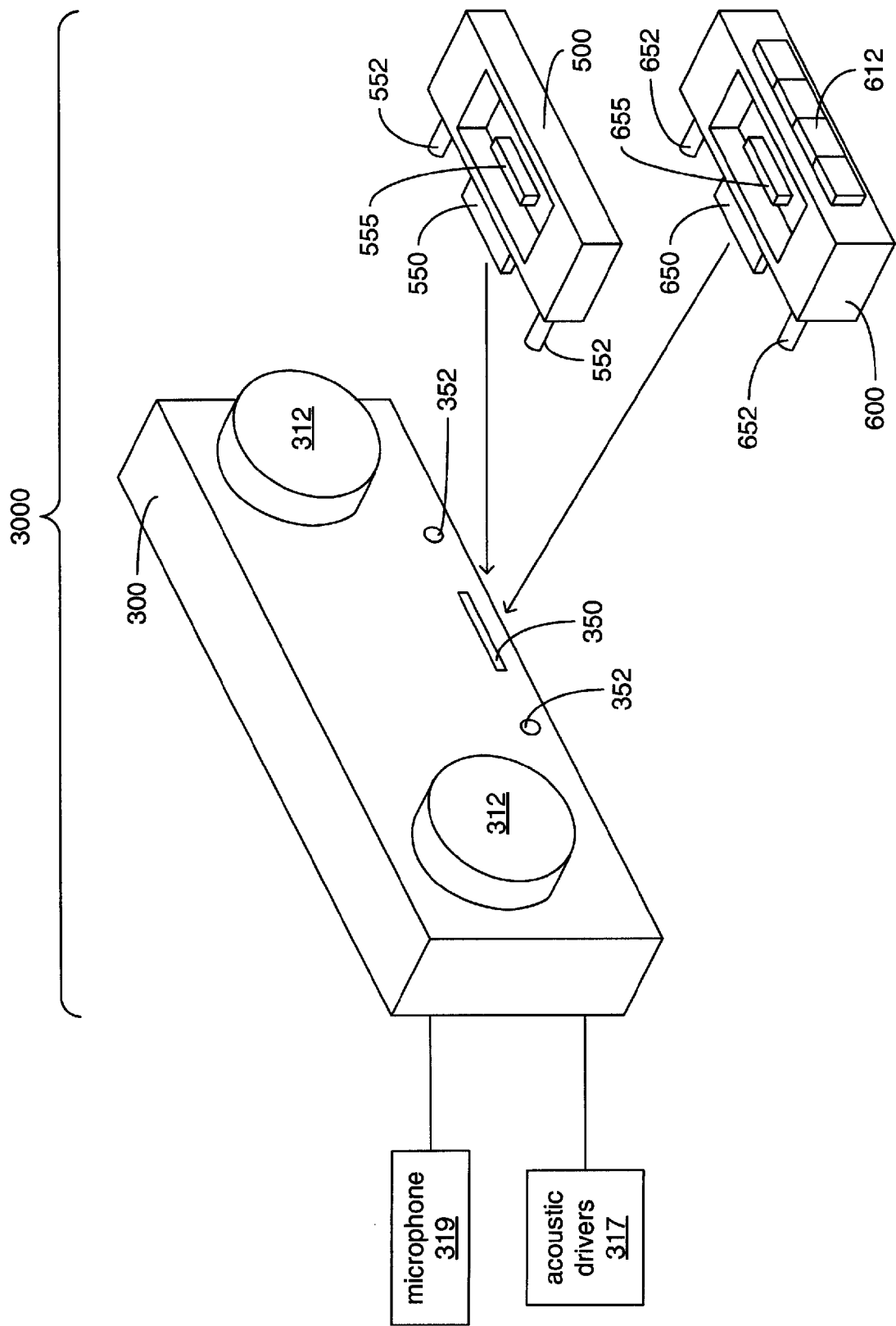
FIG. 5 is an exploded perspective view of still another assembly.

FIG. 5 is an exploded perspective diagram of an assembly 3000 made up of a base device 300 and one or the other of docking adapters 500 and 600. Not unlike the base device 100 of the assembly 1000 of FIG. 1, the base device 300 cooperates with at least one or the other of the docking adapters 500 and 600 to enable the base device 300 to cooperate with differing personal portable devices to perform an audio/visual task. However, while the base device 100 of the assembly 1000 directly incorporated one or more acoustic drivers, the base device 300 is meant to be coupled to external acoustic drivers 317 and the base device 300 further coupled to an external microphone 319 to convey captured audio to a personal portable device in addition to audibly outputting audio provided by a personal portable device. As a result, the base device 300 is capable of cooperating with a personal portable device (through an appropriate one of the docking adapters 500 and 600, or still another docking adapter not shown) to audibly output audio provided by the personal portable device via the external acoustic drivers 317, or to convey audio captured by the external microphone 319 to the personal portable device. Also as a result, the base device 300 is capable of cooperating with a personal portable device to simultaneously audibly output audio provided by the personal portable device and convey captured audio to the personal portable device, just as the base device 300 would where the base device 300 and the personal portable device were being employed by a user in carrying out a telephone conversation.

As depicted, the base device 300 has the form of a component of an audio/visual system of an automobile. Indeed, the base device 300 is physically configured to serve as what is sometimes referred to as a "head unit" of an audio/visual system of an automobile, where the base device 300 would likely be positioned amidst various other devices in a center console so as to be accessible to both the driver and front passenger of an automobile. It is for this reason that the base device 300 is depicted as being coupled to the external acoustic drivers 317 and the external microphone 319, rather than directly incorporated into the base device 300, as it is common practice to position acoustic drivers and microphones at spaced locations throughout the passenger cabin of an automobile, and not at the center console where a head unit would normally be positioned.

Not unlike the docking adapters 500 and 600 of the assembly 2000, the docking adapters 500 and 600 of the assembly 3000 are substantially similar in numerous ways to the docking adapters 500 and 600 of the assembly 1000. However, the docking adapter 600 of the assembly 3000 is depicted as having slight differences from the docking adapter 600 of the assemblies 1000 and 2000 insofar as the manually-operable control 612 is disposed on a different portion of the exterior of the docking adapter 600 of the assembly 3000 from the earlier-depicted forms of the docking adapter 600, and insofar as the visual display 615 being eliminated. These minor changes may be deemed desirable given the use of the base device 300 in an automotive environment necessitating that the position of controls relative to a driver's hands be considered. Due to these numerous similarities, corresponding elements of the docking adapters 500 and 600 of the assembly 3000 have been designated with identical numerical labels to those of the docking adapters 500 and 600 of the assembly 1000. Indeed, in some embodiments of the assemblies 1000, 2000 and/or 3000, the docking adapters 500 and 600 of both assemblies may be interchangeable among the base devices 100, 200 and 300. Further, due to numerous other similarities between the assemblies 1000, 2000 and 3000, corresponding elements of the base devices 100, 200 and 300 have been designated with similar 1xx, 2xx and 3xx numerical labels.

In a manner not unlike the base device 100 of FIG. 1 and the base device 200 of FIG. 3, the base device 300 incorporates an adapter interface 350 incorporating at least one connector to enable an electrical coupling with at least one mating connector incorporated into either of the adapter interfaces 550 and 650 of the docking adapters 500 and 600, respectively. Also not unlike the base devices 100 and 200, the base device 300 may incorporate physical couplings 352 to engage corresponding physical couplings 552 and 652 of the docking adapters 500 and 600, respectively, to provide physical support. Further, not unlike the base devices 100 and 200, the base device 300 may additionally incorporate one or more manually-operable controls 312 to enable a user of the assembly 3000 to control various aspects of one or more of the audio/visual tasks that the base device 300 is capable of cooperating with a personal portable device to perform. Although the manually-operable controls 312 are depicted as being a pair of rotatable knobs, the manually-operable controls 312 may take any of a variety of forms.

Figure 6:
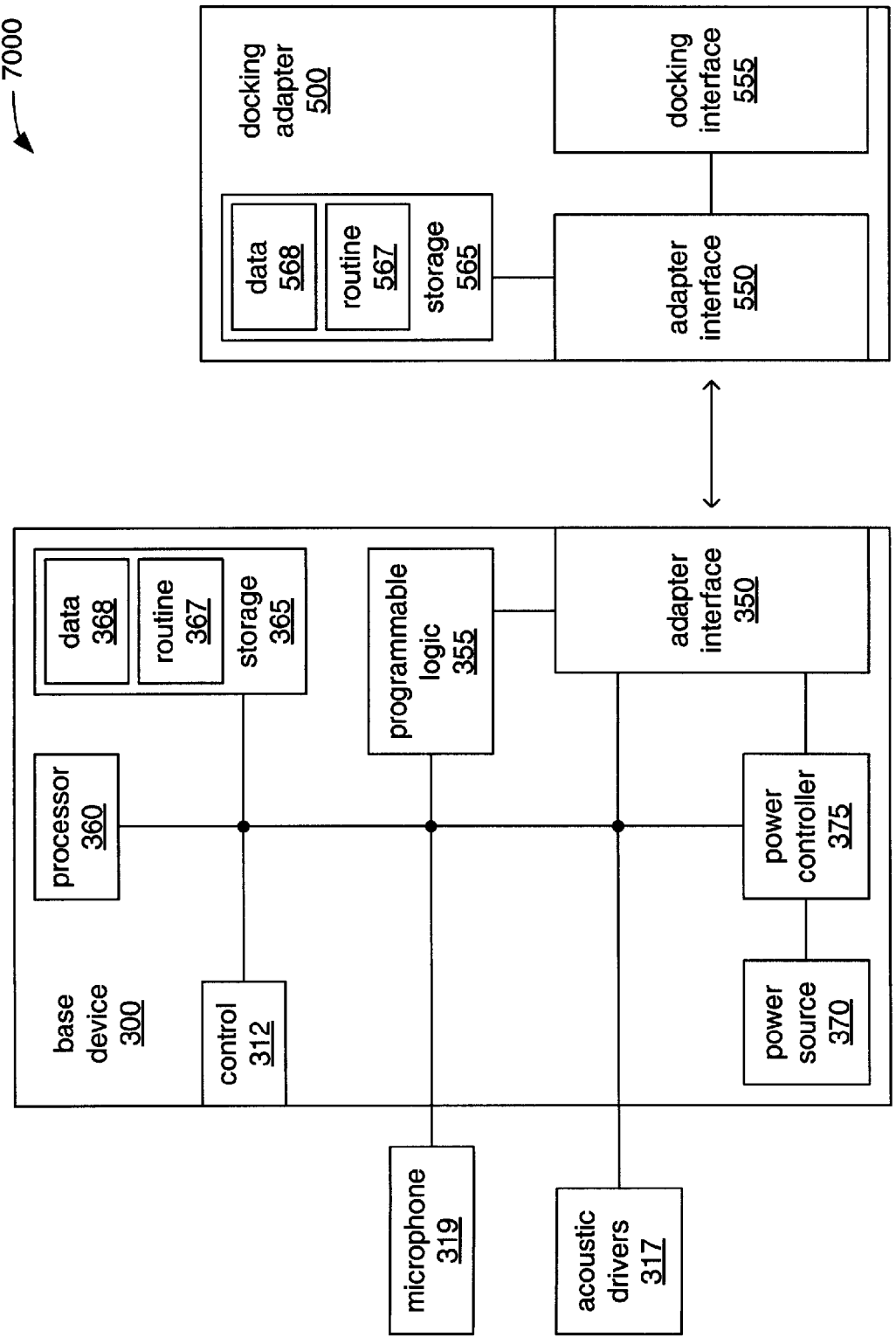
FIG. 6 is a block diagram of an internal architecture employable in the assembly of FIG. 5.

FIG. 6 is a block diagram of an internal architecture 7000 that may be employed by a variant of the assembly 3000 of FIG. 5 that incorporates the base device 300 and the docking adapter 500 to enable a personal portable device to interact with the base device 300 to perform the audio/visual task of audibly outputting audio provided by a personal portable device, the audio/visual task of providing captured audio to a personal portable device, or the audio/visual task of both audibly outputting audio provided by a personal portable device and providing the personal portable device with captured audio in a 2-way exchange of audio with the personal portable device. Again, despite the depiction of the docking adapter 500, other docking adapters (such as the docking adapter 600) may be employed, instead. The internal architecture 7000 is substantially similar to the internal architecture 9100 of FIG. 2b, though with the substantial difference of the base device 300 being designed to be coupled to the external acoustic drivers 317 and the external acoustic microphone 319, rather than directly incorporating either. Due to numerous similarities between the internal architectures 9100 and 7000, corresponding elements of the docking adapters 500 and 600 have been designated with identical numerical labels, and corresponding elements of the base devices 100 and 300 have been designated with similar 1xx and 3xx numerical labels.

In a manner not unlike the base device 100 of the internal architecture 9100, the base device 300 of the internal architecture 7000 incorporates the adapter interface 350 incorporating at least one connector, a programmable logic 355, a processor 360, a storage 365 in which a routine 367 and a data 368 are stored, a power source 370 and a power controller 375. The base device 300 may further incorporate the manually operable controls 312. Not unlike the processor 160 of the internal architecture 9100, the processor 360 of the internal architecture 7000 has access to the storage 365, the programmable logic 355, the manually-operable controls 312 (if present), the adapter interface 350 and the power controller 375. Further, the processor 360 also has access to the external acoustic drivers 317 and the external microphone 319, when each is coupled to the base device 300.

Not unlike the docking adapter 500 of the internal architecture 9100, the docking adapter 500 of the internal architecture 7000 incorporates the adapter interface 550 incorporating at least one connector capable of mating with the at least one connector of the adapter interface 350 of the base device 300, the docking interface 555 incorporating at least one connector capable of mating with at least one connector of a personal portable device, and a storage 565 storing a data 568 and a routine 567. Also, the docking interface 555 providing access to a personal portable device docked to the docking adapter 500 and the storage 565 are accessible by the base device 300 through the adapter interface 550 when the base device 300 is coupled to the docking adapter 500 through the adapter interfaces 350 and 550.

The processor 360, the storages 365 and 565, the power source 370 and the programmable logic 355 may each, again, be based on any of a variety of possible technologies. Further, the external acoustic drivers 317 and the microphone 319 may also be based on any of a variety of technologies. The programmable logic 355 provides a reconfigurable form of interface logic between the processor 360 and whatever personal portable device may be coupled to the base device 300 by way of being docked to a docking adapter (such as the docking adapter 500).

Not unlike the processor 160 of the internal architecture 9100, the processor 360 is caused by the routine 367 to variously perform tests to identify the docking adapter 500, tests to identify a personal portable device docked with the docking adapter 500, compare portions of the data 368 and the data 568 to select configuration data, and/or compare portions of the routine 367 and the routine 567 to select a sequence of instructions to be executed by the processor 360 in performing an audio/visual task. Further, the processor 360, not unlike the processor 160, may rely on the tying of pins of one or more connectors to high or low voltages and/or stored sequences of values in performing such tests and selecting such configuration data and/or sequences of instructions.

With a personal portable device docked with a docking adapter coupled to the base device 300, and with the necessary selecting of configuration data and/or sequences of instructions accomplished, the base device 300 is ready to interact with that personal portable device through that docking adapter to perform an audio/visual task as directed by the user of both devices.

Other embodiments are within the scope of the following claims.

What is claimed is:
1. An apparatus comprising:
an adapter interface to couple the apparatus to a docking adapter to enable the apparatus to cooperate with a personal portable device docked to the apparatus through the docking adapter to perform an audio/visual task, where the adapter interface is structured to enable the identity of the docking adapter to be determined by the apparatus;
a programmable logic electrically coupled to the adapter interface to enable electrical signaling characteristics of the adapter interface to be reconfigurable, comprising a plurality of alterably interconnected circuits, and structured to be configured with a configuration data specifying interconnections among circuits of the plurality of circuits within the programmable logic to define electrical signaling characteristics of the adapter interface provided by the programmable logic that are required by the personal portable device to enable an exchange of electrical signals between the programmable logic and the personal portable device through the docking adapter;
wherein the configuration data is selected by the apparatus in response to the docking adapter being coupled to the apparatus through the adapter interface and in response to the identity of the docking adapter, and is employed by the apparatus to configure interconnections among circuits of the plurality of circuits within the programmable logic; and
wherein the apparatus is structured to enable an acoustic driver to audibly output audio provided by the personal portable device to the apparatus through the docking adapter as part of the audio/visual task.

2. The apparatus of claim 1, wherein the adapter interface has a connector having a plurality of contacts to mate with a plurality of corresponding contacts of a corresponding connector of the docking adapter, and wherein the apparatus is structured to determine the identity of the docking adapter by detecting voltage levels of the plurality of corresponding contacts.

3. The apparatus of claim 1, wherein the apparatus is further structured to identify the docking adapter by accessing a storage of the docking adapter through the adapter interface and detecting identifying data stored within the storage of the docking adapter.

4. The apparatus of claim 1, further comprising the acoustic driver.

5. The apparatus of claim 1, further comprising a visual display to display visual imagery provided by the personal portable device to the apparatus as part of the audio/visual task.

6. The apparatus of claim 1, wherein the apparatus is further structured to detect audio with a microphone and to provide the audio to the personal portable device through the docking adapter as part of the audio/visual task.

7. The apparatus of claim 1, further comprising a first storage to store a first data from which the configuration data is able to be selected.

8. The apparatus of claim 7, wherein the configuration data is able to be selected from a second data stored in a second storage of the docking adapter and is able to be retrieved from the second storage through the adapter interface.

9. The apparatus of claim 8, wherein the apparatus is further structured to compare a first version of the first data and a second version of the second data, and to select the configuration data from one of the first data and the second data in response to a result of comparing the first version and the second version.

10. The apparatus of claim 8, wherein the second data comprises a plurality of portions wherein each portion of the plurality of portions of the second data corresponds to an identity of the programmable logic, and wherein the apparatus is further structured to select the configuration data from among the plurality of portions of the second data in response to the identity of the programmable logic.

11. The apparatus of claim 8, wherein the second data comprises a plurality of portions wherein each portion of the plurality of portions of the second data corresponds to an identity of the apparatus, and wherein the apparatus is further structured to select the configuration data from among the plurality of portions of the second data in response to the identity of the apparatus.

12. The apparatus of claim 7, further comprising:
a processor; and
wherein the first storage stores a first routine from which a sequence of instructions to be executed by the processor to cause the processor to perform the audio/visual task may be selected.

13. The apparatus of claim 12, wherein the sequence of instructions is able to be selected from a second routine stored in a second storage of the docking adapter and is able to be retrieved from the second storage through the adapter interface.

14. The apparatus of claim 13, wherein the apparatus is further structured to compare a first version of the first routine and a second version of the second routine, and to select the sequence of instructions from one of the first routine and the second routine in response to a result of comparing the first version and the second version.

15. The apparatus of claim 13, wherein the second data comprises a plurality of portions wherein each portion of the plurality of portions of the second routine corresponds to an identity of the apparatus, and wherein the apparatus is further structured to select the sequence of instructions from among the plurality of portions of the second routine in response to the identity of the apparatus.

16. The apparatus of claim 13, wherein the second data comprises a plurality of portions wherein each portion of the plurality of portions of the second routine corresponds to an identity of the processor, and wherein the apparatus is further structured to select the sequence of instructions from among the plurality of portions of the second routine in response to the identity of the processor.

17. The apparatus of claim 1 wherein:
the adapter interface is further structured to couple the apparatus to another docking adapter having a wireless transceiver to enable the apparatus to cooperate with another personal portable device linked to the other docking adapter through a wireless link to perform another audio/visual task, where the adapter interface is structured to enable the identity of the other docking adapter to be determined;
the configuration data is selected in response to the other docking adapter being coupled to the adapter interface and in response to the identity of the other docking adapter; and
the apparatus is further structured to enable the acoustic driver to audibly output audio provided by the other personal portable device to the apparatus through the other docking adapter as part of the other audio/visual task.

18. The apparatus of claim 17, wherein the adapter interface has a connector having a plurality of contacts to mate with a plurality of corresponding contacts of a corresponding connector of the other docking adapter, and wherein the apparatus is structured to determine the identity of the other docking adapter by detecting voltage levels of the plurality of corresponding contacts.

19. The apparatus of claim 17, wherein the apparatus is further structured to identify the other docking adapter by accessing a storage of the other docking adapter through the adapter interface and detecting identifying data stored within the storage of the other docking adapter.

20. The apparatus of claim 17, further comprising a first storage to store a first data from which the configuration data is able to be selected.

21. The apparatus of claim 20, wherein the configuration data is able to be selected from a second data stored in a second storage of the other docking adapter.

22. The apparatus of claim 20, further comprising:
a processor; and
wherein the first storage stores a first routine from which a sequence of instructions to be executed by the processor to cause the processor to cooperate with another processor of the other docking adapter through the programmable logic and the adapter interface to perform the other audio/visual task may be selected.

23. The apparatus of claim 22, wherein the sequence of instructions is able to be selected from a second routine stored in a second storage of the other docking adapter.

24. The apparatus of claim 1, wherein the electrical signaling characteristic required by the personal portable device is selected from a set consisting of a timing requirement, a protocol requirement, a requirement of a bit rate of a serial interface, a queue depth, a clock rate, and a bus width of a parallel interface.

25. A method comprising:
determining an identity of a docking adapter coupled to an adapter interface of a base device in response to the docking adapter being coupled to the base device through the adapter interface, wherein the base device is structured to cooperate with a personal portable device through the adapter interface, through a programmable logic of the base device that is coupled to the adapter interface to enable electrical signaling characteristics of the adapter interface to be reconfigurable, and through the docking adapter to perform an audio/visual task entailing audibly outputting audio provided to the base device by the personal portable device;
selecting a configuration data specifying interconnections among circuits of a plurality of alterably interconnected circuits within the programmable logic in response to the identity of the docking adapter; and
configuring interconnections among circuits of the plurality of circuits within the programmable logic in accordance with the configuration data to define electrical signaling characteristics of the adapter interface by which the docking adapter is coupled to the base device and which are required by the personal portable device to enable an exchange of electrical signals between the programmable logic and the personal portable device to enable the base device to cooperate with the personal portable device to perform the audio/visual task.

26. The method of claim 25, wherein selecting the configuration data in response to the identity of the docking adapter comprises:
selecting the configuration data from a first data stored in the base device if the identity of the docking adapter indicates that the configuration data is within the first data; and
selecting the configuration data from a second data stored in the docking adapter and retrieving the configuration data from the docking adapter through the adapter interface in response to the identity of the docking adapter indicating that the configuration data is not within the first data.

27. The method of claim 25, further comprising:
comparing a first version of a first data stored in the base device to a second version of a second data stored in the docking adapter; and
selecting the configuration data from a second data stored in the docking adapter and retrieving the configuration data from the docking adapter through the adapter interface in response to a result of comparing the first and second versions.

28. The method of claim 25, further comprising:
determining an identity of the programmable logic; and
selecting and retrieving through the adapter interface the configuration data in response to the identity of the programmable logic from a plurality of portions of a data stored in the docking adapter, wherein each portion of the plurality of portions of the data comprises a different configuration data that corresponds to a different identity of the programmable logic.

29. The method of claim 25, further comprising:
determining an identity of the base device; and
selecting and retrieving through the adapter interface the configuration data in response to the identity of the base device from a plurality of portions of a data stored in the docking adapter, wherein each portion of the plurality of portions of the data comprises a different configuration data that corresponds to a different base device to which the docking adapter is able to be coupled.

30. The method of claim 25, further comprising selecting a sequence of instructions to be executed by a processor of the base device in response to the identity of the docking adapter.

31. The method of claim 30, wherein selecting the sequence of instructions in response to the identity of the docking adapter comprises:
selecting the sequence of instructions from a first routine stored in the base device if the identity of the docking adapter indicates that the sequence of instructions is within the first routine; and
selecting the sequence of instructions from a second routine stored in the docking adapter and retrieving the sequence of instructions from the docking adapter through the adapter interface if the identity of the docking adapter indicates that the sequence of instructions is not within the first routine.

32. The method of claim 30, further comprising:
comparing a first version of a first routine stored in the base device to a second version of a second routine stored in the docking adapter; and
selecting the sequence of instructions from one of the first routine and the second routine in response to a result of comparing the first and second versions.

33. The method of claim 30, further comprising:
determining an identity of the processor; and
selecting and retrieving through the adapter interface the sequence of instructions in response to the identity of the processor from a plurality of portions of a routine stored in the docking adapter, wherein each portion of the plurality of portions of the routine comprises a different sequence of instructions that corresponds to a different identity of the processor.

34. The method of claim 30, further comprising:
determining an identity of the base device; and
selecting and retrieving through the adapter interface the sequence of instructions in response to the identity of the base device from a plurality of portions of a routine stored in the docking adapter, wherein each portion of the plurality of portions of the routine comprises a different sequence of instructions that corresponds to a different base device to which the docking adapter is able to be coupled.

35. The method of claim 25, wherein the electrical signaling characteristic required by the personal portable device is selected from a set consisting of a timing requirement, a protocol requirement, a requirement of a bit rate of a serial interface, a queue depth, a clock rate, and a bus width of a parallel interface.

36. An apparatus comprising:
an adapter interface to couple the apparatus to a base device to enable the base device to cooperate with a personal portable device docked through the apparatus to the base device to perform an audio/visual task in which the personal portable device provides the base device with audio to audibly output through the apparatus, wherein the adapter interface is structured to enable an identity of the apparatus to be determined by the base device; and
a storage accessible to the base device upon coupling the apparatus to the base device through the adapter interface, and storing a data from which a configuration data specifying interconnections among circuits of a plurality of alterably interconnected circuits within a programmable logic of the base device may be selected by the base device in response to the coupling of the apparatus to the base device through the adapter interface and in response to the identity of the apparatus to define electrical signaling characteristics of a corresponding adapter interface of the base device provided by the programmable logic that are required by the personal portable device to enable an exchange of electrical signals between the programmable logic and the personal portable device to enable the base device to cooperate with the personal portable device through the apparatus to perform the audio/visual task, wherein the programmable logic is coupled to the corresponding adapter interface of the base device to enable electrical signaling characteristics of the corresponding adapter interface to be reconfigurable.

37. The apparatus of claim 36, wherein the adapter interface has a connector having a plurality of contacts to mate with a plurality of corresponding contacts of a corresponding connector of the corresponding adapter interface of the base device, and wherein the apparatus is structured to provide the identity of the apparatus by tying at least one contact of the plurality of contacts to a voltage level.

38. The apparatus of claim 36, further comprising a storage accessible by the base device through the adapter interface to enable the base device to obtain the identity of the apparatus.

39. The apparatus of claim 36, wherein the data comprises a plurality of portions wherein each portion of the plurality of portions of the data corresponds to an identity of the programmable logic, and wherein the storage is structured to enable the base device to select the configuration data from among the plurality of portions of the data in response to the identity of the programmable logic and to retrieve the configuration data from the apparatus through the adapter interface.

40. The apparatus of claim 36, wherein the data comprises a plurality of portions wherein each portion of the plurality of portions of the data corresponds to an identity of the base device, and wherein the storage is structured to enable the base device to select the configuration data from among the plurality of portions of the data in response to the identity of the base device and to retrieve the configuration data from the apparatus through the adapter interface.

41. The apparatus of claim 36, further comprising a processor to assist a processor of the base device in enabling cooperation between the base device and the personal portable device in performing the audio/visual task.

42. The apparatus of claim 41, further comprising a wireless transceiver to enable wireless communications between the apparatus and the personal portable device in lieu of the personal portable device being docked with the apparatus to enable cooperation between the base device and the personal portable device in performing the audio/visual task.

43. The apparatus of claim 36, wherein the electrical signaling characteristic required by the personal portable device is selected from a set consisting of a timing requirement, a protocol requirement, a requirement of a bit rate of a serial interface, a queue depth, a clock rate, and a bus width of a parallel interface.

44. An apparatus comprising:
a transceiver to form a wireless link between the apparatus and a personal portable device;
an adapter interface to couple the apparatus to a base device to enable the base device to cooperate with the personal portable device through the adapter interface and the wireless link to perform an audio/visual task in which the personal portable device provides the base device with audio through the wireless link and the adapter interface to audibly output, wherein the adapter interface is structured to enable an identity of the apparatus to be determined by the base device; and
a storage accessible to the base device through the adapter interface upon coupling the apparatus to the base device through the adapter interface, and storing a data from which a configuration data specifying interconnections among circuits of a plurality of alterably interconnected circuits within a programmable logic of the base device may be selected by the base device in response to the apparatus being coupled to the base device and in response to the identity of the apparatus to define electrical signaling characteristics of a corresponding adapter interface of the base device provided by the programmable logic that are required by the apparatus to enable an exchange of electrical signals between the programmable logic and the apparatus to enable the base device to cooperate with the personal portable device through the apparatus to perform the audio/visual task, wherein the programmable logic is coupled to the corresponding adapter interface of the base device to enable electrical signaling characteristics of the corresponding adapter interface to be reconfigurable.

45. The apparatus of claim 44, wherein the adapter interface has a connector having a plurality of contacts to mate with a plurality of corresponding contacts of a corresponding connector of the corresponding adapter interface of the base device, and wherein the apparatus is structured to provide the identity of the apparatus by tying at least one contact of the plurality of contacts to a voltage level.

46. The apparatus of claim 44, further comprising a storage accessible by the base device through the adapter interface to enable the base device to obtain the identity of the apparatus.

47. The apparatus of claim 44, wherein the data comprises a plurality of portions wherein each portion of the plurality of portions of the data corresponds to an identity of the programmable logic, and wherein the storage is structured to enable the base device to select the configuration data from among the plurality of portions of the data and to retrieve the configuration data from the apparatus through the adapter interface in response to the identity of the programmable logic.

48. The apparatus of claim 44, wherein the data comprises a plurality of portions wherein each portion of the plurality of portions of the data corresponds to an identity of the base device, and wherein the storage is structured to enable the base device to select the configuration data from among the plurality of portions of the data and to retrieve the configuration data from the apparatus through the adapter interface in response to the identity of the base device.

49. The apparatus of claim 44, further comprising a processor to assist a processor of the base device in enabling cooperation between the base device and the personal portable device in performing the audio/visual task, wherein the processor of the apparatus executes a sequence of instructions of a routine stored in the storage causing the processor of the apparatus to operate the transceiver to support at least a portion of a protocol employed in the wireless link.

50. The apparatus of claim 49, further comprising a docking interface to enable docking between the apparatus and the personal portable device in lieu of the wireless link to enable cooperation between the base device and the personal portable device in performing the audio/visual task through the adapter and docking interfaces.

51. The apparatus of claim 44, wherein the electrical signaling characteristic required by the apparatus is selected from a set consisting of a timing requirement, a protocol requirement, a requirement of a bit rate of a serial interface, a queue depth, a clock rate, and a bus width of a parallel interface.

* * * * *